(12) United States Patent
Kiang et al.

(10) Patent No.: US 9,197,718 B2
(45) Date of Patent: Nov. 24, 2015

(54) CENTRAL MANAGEMENT AND CONTROL OF USER-CONTRIBUTED CONTENT IN A WEB-BASED COLLABORATION ENVIRONMENT AND MANAGEMENT CONSOLE THEREOF

(75) Inventors: Andy Kiang, Los Altos, CA (US); David T. Lee, Los Altos, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/547,264

(22) Filed: Jul. 12, 2012

(65) Prior Publication Data

US 2013/0080919 A1    Mar. 28, 2013

Related U.S. Application Data

(60) Provisional application No. 61/538,782, filed on Sep. 23, 2011.

(51) Int. Cl.
    *H04L 29/08*    (2006.01)
    *G06Q 10/10*    (2012.01)
    *G06F 9/44*     (2006.01)

(52) U.S. Cl.
    CPC .............. *H04L 67/327* (2013.01); *G06Q 10/10* (2013.01); *G06F 9/4443* (2013.01)

(58) Field of Classification Search
    CPC . G06F 17/241; G06F 17/2288; G06F 17/212; G06Q 10/10
    USPC .................. 715/741–743, 751–753, 811, 968
    See application file for complete search history.

(56) References Cited

U.S. PATENT DOCUMENTS

| | | | |
|---|---|---|---|
| 858,619 A | 7/1907 | O'Farrell | |
| 5,787,175 A | 7/1998 | Carter | |
| 5,799,320 A | 8/1998 | Klug | |
| 5,848,415 A | 12/1998 | Guck | |

(Continued)

FOREIGN PATENT DOCUMENTS

| CA | 2724521 | 11/2009 |
|---|---|---|
| CN | 101997924 A | 3/2011 |

(Continued)

OTHER PUBLICATIONS

Nancy Conner, "Google Apps: The Missing Manual", published by O'Reilly Media, May 27, 2008.*

(Continued)

*Primary Examiner* — Andrew Tank
(74) *Attorney, Agent, or Firm* — Perkins Coie LLP

(57) ABSTRACT

Systems and methods for central management and control of user-contributed content in a web-based collaboration environment are disclosed. In one aspect, embodiments of the present disclosure include a method, which may be implemented on a system, for enabling an administrative user in an enterprise setting to centrally manage and control content provided by other users of the enterprise in a web-based collaboration environment. In one embodiment, a view providing access to an aggregate of the content or a selection thereof provided by the other users is depicted in a user interface for the administrative user to access the web-based collaboration environment. The user interface for the administrative user includes both of a management console to access the content provided by other users and a panel for accessing an account of the user and work items owned by the administrative user.

22 Claims, 22 Drawing Sheets

(56) References Cited

U.S. PATENT DOCUMENTS

| | | |
|---|---|---|
| 5,999,908 A | 12/1999 | Abelow |
| 6,016,467 A | 1/2000 | Newsted et al. |
| 6,034,621 A | 3/2000 | Kaufman |
| 6,073,161 A | 6/2000 | DeBoskey et al. |
| 6,098,078 A | 8/2000 | Gehani et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 * | 2/2003 | Knight ............ 715/751 |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 * | 4/2008 | Yang et al. ............ 709/204 |
| 7,386,535 B1 * | 6/2008 | Kalucha et al. ............ 1/1 |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 * | 1/2010 | Yozell-Epstein et al. ..... 715/752 |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 * | 10/2010 | Huesken et al. ............ 715/762 |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 * | 7/2011 | Kruse et al. ............ 705/7.26 |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 * | 5/2012 | Saha et al. ............ 715/762 |
| 8,214,747 B1 | 7/2012 | Yankovich et al. |
| 8,230,348 B2 | 7/2012 | Peters et al. |
| 8,326,814 B2 | 12/2012 | Ghods et al. |
| 8,347,276 B2 * | 1/2013 | Schadow ............ 717/137 |
| 8,358,701 B2 | 1/2013 | Chou et al. |
| 8,370,803 B1 * | 2/2013 | Holler et al. ............ 717/120 |
| 8,429,540 B1 | 4/2013 | Yankovich et al. |
| 8,464,161 B2 | 6/2013 | Giles et al. |
| 8,515,902 B2 | 8/2013 | Savage |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,719,445 B2 | 5/2014 | Ko |
| 8,745,267 B2 | 6/2014 | Luecke et al. |
| 8,868,574 B2 | 10/2014 | Kiang et al. |
| 8,892,679 B1 | 11/2014 | Destagnol et al. |
| 8,914,900 B2 | 12/2014 | Smith et al. |
| 8,918,387 B1 | 12/2014 | Sokolov |
| 8,949,939 B2 | 2/2015 | Peddada |
| 8,959,579 B2 | 2/2015 | Barton et al. |
| 8,990,955 B2 | 3/2015 | Hymel et al. |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 * | 10/2004 | Zak et al. ............ 345/733 |
| 2004/0201604 A1 | 10/2004 | Kraenzel et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0070083 A1 | 3/2006 | Brunswig et al. |
| 2006/0075071 A1 | 4/2006 | Gillette |

(56) References Cited

U.S. PATENT DOCUMENTS

| | | | |
|---|---|---|---|
| 2006/0117247 A1* | 6/2006 | Fite et al. | 715/511 |
| 2006/0123062 A1 | 6/2006 | Bobbitt et al. | |
| 2006/0168550 A1 | 7/2006 | Muller et al. | |
| 2006/0174051 A1 | 8/2006 | Lordi et al. | |
| 2006/0174054 A1* | 8/2006 | Matsuki | 711/100 |
| 2006/0179070 A1 | 8/2006 | George et al. | |
| 2006/0242204 A1 | 10/2006 | Karas et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2007/0016680 A1 | 1/2007 | Burd et al. | |
| 2007/0038934 A1 | 2/2007 | Fellman | |
| 2007/0079242 A1 | 4/2007 | Jolley et al. | |
| 2007/0100830 A1 | 5/2007 | Beedubail et al. | |
| 2007/0115845 A1 | 5/2007 | Hochwarth et al. | |
| 2007/0124460 A1 | 5/2007 | McMullen et al. | |
| 2007/0124781 A1 | 5/2007 | Casey et al. | |
| 2007/0126635 A1 | 6/2007 | Houri | |
| 2007/0130143 A1 | 6/2007 | Zhang et al. | |
| 2007/0130163 A1* | 6/2007 | Perez et al. | 707/10 |
| 2007/0198609 A1 | 8/2007 | Black et al. | |
| 2007/0208878 A1 | 9/2007 | Barnes-Leon et al. | |
| 2007/0214180 A1 | 9/2007 | Crawford | |
| 2007/0220016 A1 | 9/2007 | Estrada et al. | |
| 2007/0220590 A1 | 9/2007 | Rasmussen et al. | |
| 2007/0240057 A1 | 10/2007 | Satterfield et al. | |
| 2007/0250762 A1 | 10/2007 | Mansfield | |
| 2007/0256065 A1 | 11/2007 | Heishi et al. | |
| 2007/0266304 A1 | 11/2007 | Fletcher et al. | |
| 2007/0282848 A1 | 12/2007 | Kiilerich et al. | |
| 2007/0283443 A1 | 12/2007 | McPherson et al. | |
| 2007/0288290 A1 | 12/2007 | Motoyama et al. | |
| 2008/0005195 A1 | 1/2008 | Li | |
| 2008/0016146 A1 | 1/2008 | Gan et al. | |
| 2008/0021959 A1 | 1/2008 | Naghi et al. | |
| 2008/0028323 A1 | 1/2008 | Rosen et al. | |
| 2008/0040173 A1 | 2/2008 | Aleong et al. | |
| 2008/0040503 A1 | 2/2008 | Kleks et al. | |
| 2008/0059656 A1 | 3/2008 | Saliba et al. | |
| 2008/0063210 A1 | 3/2008 | Goodman et al. | |
| 2008/0065881 A1 | 3/2008 | Dawson et al. | |
| 2008/0077631 A1 | 3/2008 | Petri | |
| 2008/0091763 A1 | 4/2008 | Devonshire et al. | |
| 2008/0091790 A1 | 4/2008 | Beck | |
| 2008/0104277 A1 | 5/2008 | Tian | |
| 2008/0114720 A1 | 5/2008 | Smith et al. | |
| 2008/0133674 A1 | 6/2008 | Knauerhase et al. | |
| 2008/0140732 A1 | 6/2008 | Wilson et al. | |
| 2008/0147790 A1 | 6/2008 | Malaney et al. | |
| 2008/0151817 A1 | 6/2008 | Fitchett et al. | |
| 2008/0154873 A1 | 6/2008 | Redlich et al. | |
| 2008/0182628 A1 | 7/2008 | Lee et al. | |
| 2008/0183467 A1 | 7/2008 | Yuan et al. | |
| 2008/0184130 A1 | 7/2008 | Tien et al. | |
| 2008/0194239 A1 | 8/2008 | Hagan | |
| 2008/0215883 A1 | 9/2008 | Fok et al. | |
| 2008/0222654 A1 | 9/2008 | Xu et al. | |
| 2008/0243855 A1 | 10/2008 | Prahlad et al. | |
| 2008/0250333 A1 | 10/2008 | Reeves et al. | |
| 2008/0250348 A1 | 10/2008 | Alimpich et al. | |
| 2008/0271095 A1 | 10/2008 | Shafton | |
| 2008/0276158 A1 | 11/2008 | Lim et al. | |
| 2009/0015864 A1 | 1/2009 | Hasegawa | |
| 2009/0019093 A1 | 1/2009 | Brodersen et al. | |
| 2009/0019426 A1 | 1/2009 | Baeumer et al. | |
| 2009/0030710 A1 | 1/2009 | Levine | |
| 2009/0044128 A1 | 2/2009 | Baumgarten et al. | |
| 2009/0049131 A1 | 2/2009 | Lyle et al. | |
| 2009/0119322 A1 | 5/2009 | Mills et al. | |
| 2009/0125469 A1 | 5/2009 | McDonald et al. | |
| 2009/0132651 A1 | 5/2009 | Roger et al. | |
| 2009/0138808 A1 | 5/2009 | Moromisato et al. | |
| 2009/0150417 A1 | 6/2009 | Ghods et al. | |
| 2009/0150627 A1 | 6/2009 | Benhase et al. | |
| 2009/0164438 A1 | 6/2009 | Delacruz | |
| 2009/0171983 A1 | 7/2009 | Samji et al. | |
| 2009/0193107 A1 | 7/2009 | Srinivasan et al. | |
| 2009/0193345 A1 | 7/2009 | Wensley et al. | |
| 2009/0198772 A1 | 8/2009 | Kim et al. | |
| 2009/0210459 A1 | 8/2009 | Nair et al. | |
| 2009/0214115 A1 | 8/2009 | Kimura et al. | |
| 2009/0235167 A1 | 9/2009 | Boyer et al. | |
| 2009/0235181 A1 | 9/2009 | Saliba et al. | |
| 2009/0235189 A1 | 9/2009 | Aybes et al. | |
| 2009/0249224 A1 | 10/2009 | Davis et al. | |
| 2009/0254589 A1 | 10/2009 | Nair et al. | |
| 2009/0260060 A1 | 10/2009 | Smith et al. | |
| 2009/0265430 A1 | 10/2009 | Bechtel et al. | |
| 2009/0276771 A1 | 11/2009 | Nickolov et al. | |
| 2009/0282212 A1 | 11/2009 | Peterson | |
| 2009/0282483 A1 | 11/2009 | Bennett | |
| 2009/0300356 A1 | 12/2009 | Crandell | |
| 2009/0300527 A1 | 12/2009 | Malcolm et al. | |
| 2009/0327358 A1 | 12/2009 | Lukiyanov et al. | |
| 2009/0327961 A1 | 12/2009 | De Vorchik et al. | |
| 2010/0011447 A1 | 1/2010 | Jothimani | |
| 2010/0017262 A1 | 1/2010 | Iyer et al. | |
| 2010/0036929 A1 | 2/2010 | Scherpa et al. | |
| 2010/0042720 A1 | 2/2010 | Stienhans et al. | |
| 2010/0057560 A1 | 3/2010 | Skudlark et al. | |
| 2010/0057785 A1 | 3/2010 | Khosravy et al. | |
| 2010/0076946 A1* | 3/2010 | Barker et al. | 707/705 |
| 2010/0082634 A1 | 4/2010 | Leban | |
| 2010/0088150 A1 | 4/2010 | Mazhar et al. | |
| 2010/0092126 A1 | 4/2010 | Kaliszek et al. | |
| 2010/0093310 A1 | 4/2010 | Gbadegesin et al. | |
| 2010/0107225 A1 | 4/2010 | Spencer et al. | |
| 2010/0151431 A1 | 6/2010 | Miller | |
| 2010/0153835 A1 | 6/2010 | Xiong et al. | |
| 2010/0162365 A1 | 6/2010 | Del Real | |
| 2010/0162374 A1 | 6/2010 | Nair | |
| 2010/0179940 A1 | 7/2010 | Gilder et al. | |
| 2010/0185463 A1 | 7/2010 | Noland et al. | |
| 2010/0185932 A1 | 7/2010 | Coffman et al. | |
| 2010/0191689 A1 | 7/2010 | Cortes et al. | |
| 2010/0198783 A1 | 8/2010 | Wang et al. | |
| 2010/0198871 A1 | 8/2010 | Stiegler et al. | |
| 2010/0198944 A1 | 8/2010 | Ho et al. | |
| 2010/0205537 A1 | 8/2010 | Knighton et al. | |
| 2010/0218237 A1 | 8/2010 | Ferris et al. | |
| 2010/0223378 A1 | 9/2010 | Wei | |
| 2010/0229085 A1 | 9/2010 | Nelson et al. | |
| 2010/0235526 A1 | 9/2010 | Carter et al. | |
| 2010/0235539 A1 | 9/2010 | Carter et al. | |
| 2010/0241972 A1 | 9/2010 | Spataro et al. | |
| 2010/0250120 A1 | 9/2010 | Waupotitsch et al. | |
| 2010/0251340 A1 | 9/2010 | Martin et al. | |
| 2010/0262582 A1 | 10/2010 | Garcia-Ascanio et al. | |
| 2010/0267588 A1 | 10/2010 | Nelson et al. | |
| 2010/0274765 A1 | 10/2010 | Murphy et al. | |
| 2010/0274772 A1 | 10/2010 | Samuels | |
| 2010/0281118 A1 | 11/2010 | Donahue et al. | |
| 2010/0290623 A1 | 11/2010 | Banks et al. | |
| 2010/0318893 A1 | 12/2010 | Matthews et al. | |
| 2010/0322252 A1 | 12/2010 | Suganthi et al. | |
| 2010/0325155 A1 | 12/2010 | Skinner et al. | |
| 2010/0325527 A1 | 12/2010 | Estrada et al. | |
| 2010/0325559 A1 | 12/2010 | Westerinen et al. | |
| 2010/0325655 A1 | 12/2010 | Perez | |
| 2010/0332401 A1* | 12/2010 | Prahlad et al. | 705/80 |
| 2010/0332962 A1 | 12/2010 | Hammer et al. | |
| 2010/0333116 A1 | 12/2010 | Prahlad et al. | |
| 2011/0001763 A1 | 1/2011 | Murakami | |
| 2011/0016409 A1 | 1/2011 | Grosz et al. | |
| 2011/0022559 A1 | 1/2011 | Andersen et al. | |
| 2011/0022812 A1 | 1/2011 | Van Der Linden et al. | |
| 2011/0040812 A1 | 2/2011 | Phillips | |
| 2011/0041083 A1 | 2/2011 | Gabai et al. | |
| 2011/0047413 A1 | 2/2011 | McGill et al. | |
| 2011/0047484 A1 | 2/2011 | Mount et al. | |
| 2011/0052155 A1 | 3/2011 | Desmarais et al. | |
| 2011/0054968 A1 | 3/2011 | Galaviz | |
| 2011/0055299 A1 | 3/2011 | Phillips | |
| 2011/0055721 A1 | 3/2011 | Jain et al. | |

(56) References Cited

U.S. PATENT DOCUMENTS

| | | |
|---|---|---|
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173612 A1 | 7/2012 | Vegesna-Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1* | 7/2012 | Antebi et al. .................. 715/229 |
| 2012/0192086 A1* | 7/2012 | Ghods et al. .................. 715/753 |
| 2012/0203908 A1 | 8/2012 | Beaty et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0259964 A1 | 10/2012 | Lin et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1* | 11/2012 | Robb .............................. 705/35 |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1* | 12/2012 | Seibert et al. ................. 386/230 |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 2003273912 A | 9/2003 |
| JP | 2004310272 A | 11/2004 |
| JP | 2008250944 A | 10/2008 |
| KR | 20020017444 A | 3/2002 |
| KR | 20040028036 A | 4/2004 |
| KR | 20050017674 | 2/2005 |
| KR | 20060070306 A | 6/2006 |

(56) References Cited

FOREIGN PATENT DOCUMENTS

| | | | |
|---|---|---|---|
| KR | 20060114871 A | 11/2006 | |
| KR | 20070043353 A | 4/2007 | |
| KR | 20070100477 A | 10/2007 | |
| KR | 20100118836 A | 11/2010 | |
| KR | 20110074096 A | 6/2011 | |
| KR | 20110076831 A | 7/2011 | |
| WO | WO-0007104 A1 | 2/2000 | |
| WO | WO-0219128 A1 | 3/2002 | |
| WO | WO-2004097681 | 11/2004 | |
| WO | WO-2006028850 A2 | 3/2006 | |
| WO | WO-2007024438 A1 | 3/2007 | |
| WO | WO-2007035637 A2 | 3/2007 | |
| WO | WO-2007113573 A2 | 10/2007 | |
| WO | WO-2008076520 A2 | 6/2008 | |
| WO | WO-2011109416 A2 | 9/2011 | |
| WO | WO-2012167272 A1 | 12/2012 | |
| WO | WO-2013009328 A2 | 1/2013 | |
| WO | WO-2013013217 A1 | 1/2013 | |
| WO | WO-2013041763 A1 | 3/2013 | |
| WO | WO-2013166520 | 11/2013 | |

OTHER PUBLICATIONS

Nancy Conner, "Google Apps: The Missing Manual", published by O'Reilly Media May 27, 2008.*
International Search Report and Written Opinion for PCT/US2008/012973 dated Apr. 30, 2009, pp. 1-11.
Supplementary European Search Report European Application No. EP 08 85 8563 dated Jun. 20, 2011 pp. 1-5.
International Search Report and Written Opinion for PCT/US2011/039126 mailed on Oct. 6, 2011, pp. 1-13.
Partial International Search Report for PCT/US2011/041308 dated Feb. 27, 2012, pp. 1-2.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 Mailed Jul. 2, 2012, pp. 1-16.
International Search Report and Written Opinion for PCT/US2011/060875 Mailed Oct. 30, 2012, pp. 1-10.
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
Google Docs, http://web.Archive.org/web/20100413105758/http://en.wikipedia.org/wiki/Google_docs, Apr. 13, 2010, 6 pages.
Gedymin, "Cloud computing with an emphasis on Google App Engine," Master Final Project, Sep. 2011, 146 pages.
Exam Report for GB1316533.7, Applicant: Box, Inc. Mailed Oct. 8, 2013, 9 pages.
Exam Report for GB1316532.9, Applicant: Box, Inc. Mailed Oct. 31, 2013, 10 pages.
Exam Report for GB1310666.1, Applicant: Box, Inc. Mailed Aug. 30, 2013, 10 pages.
Exam Report for GB1309209.3, Applicant: Box, Inc. Mailed Oct. 30, 2013, 11 pages.
"QuickOffice," Wikipedia Article (old revision), published May 9, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"PaperPort," Wikipedia article (old revision), published May 19, 2012, Wikipedia Foundation, 2 pages.
"PaperPort Professional 14," PC Mag. Com review, published Feb. 2012, Ziff Davis, Inc., 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
International Search Report and Written Opinion for PCT/US2010/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
Exam Report for EP13168784.0, Applicant: Box, Inc. Mailed Nov. 21, 2013, 7 pages.
Exam Report for EP13185269.1, Applicant: Box, Inc. Mailed Jan. 28, 7 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Patent Court Document of Approved Judgment for GB0602349.3 and GB0623571.7; Mar. 3, 2009, 17 pages.
Exam Report for GB1308842.2, Applicant: Box, Inc. Mailed Mar. 10, 2014, 4 pages.

(56) References Cited

OTHER PUBLICATIONS

Exam Report for GB1314771.5, Applicant: Box, Inc. Mailed Feb. 17, 2014, 7 pages.
Partial Search Report for EP131832800, Applicant: Box, Inc. Mailed May 8, 2014, 5 pages.
Search Report for EP141509422, Applicant: Box, Inc. Mailed May 8, 2014, 7 pages.
Tulloch et al., "Windows Vista Resource Kit," Apr. 8, 2007, Microsoft Press, XP055113067, 6 pages.
"Revolving sync conflicts; frequently asked questions," Microsoft Tech Support, Jul. 16, 2012, retrieved from the Internet: http://web.archive.org/web, 2 pages.
Pyle et al., "How to enable Event logging for Offline Files (Client Side Caching) in Windows Vista," Feb. 18, 2009, retrieved from the internet: http://blogs.technet.com, 3 pages.
Duffy, "The Best File-Syncing Services," pcmag.com, retrieved from the internet: http://www.pcmag.com, Sep. 28, 2012, 7 pages.
"Troubleshoot sync problems," Microsoft Tech Support: May 2, 2012, retrieved from the internet, http://web. Archive.org/web, 3 pages.
Exam Report for GB1318792.7, Applicant: Box, Inc. Mailed May 22, 2014, 2 pages.
Exam Report for EP13177108.1, Applicant: Box, Inc. Mailed May 26, 2014, 6 pages.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1312264.3, Applicant: Box, Inc. Mailed Mar. 24, 2014, 7 pages.
John et al., "Always Sync Support Forums—View topic—Allway sync funny behavior," Allway Sync Support Forum at http://sync-center.com, Mar. 28, 2011, XP055109680, 2 pages.
Search Report for EP 11729851.3, Applicant: Box, Inc. Mailed Feb. 7, 2014, 9 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Search Report for EP13187217.8, Applicant: Box, Inc. Mailed Apr. 15, 2014, 12 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Walker, "PDF.js project meeting notes," retrieved from the internet, http://groups.google.com, May 15, 2014, 1 page.
Sommerer, "Presentable Document Format: Improved On-demand PDF to HTML Conversion," retrieved from the internet, http://research.microsoft.com, 8 pages.
"Tulsa TechFest 2012—Agenda," retrieved from the website, http://web.archive.org, Oct. 2, 2012, 2 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Cohen, "Debating the Definition of Cloud Computing Platforms," retrieved from the internet, http::://forbes.com, Feb. 3, 2014, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
Exam Report for GB1316532.9 Applicant: Box, Inc. Mailed Mar. 27, 2015, 6 pages.
Burney, "How to Move Document from Your Computer to Your iPad and Back Again," May 31, 2011, 3 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.

* cited by examiner

| Admin Console | My Account | | | | Need help? Call 1-800-875-8230 |
|---|---|---|---|---|---|
| Home | Users and Groups | Files and Folders | Reports | | |

| Files and Folders | All users▾ | | Department Work | | | | 🗇 | 🔍 Search current folder |
|---|---|---|---|---|---|---|---|---|
| ▸ Business development | | Show: All items▾ Columns▾ | | | ⬆ Upload | ✚ New…▾ | | Folder Options ▾ |
| ▸ Business creative | | | | | Displaying 1-500▾ of 5450 | | | Get link to share this folder |
| ▸ Creative work | | Name ▲ | | 💬 | 👥 | Owner | ☐ | Folder Information |
| ▾ Department Work | | 📁 Applications | | 5 | 2 | Brandon Savage | ☐ | Size: 327MB |
| ▸ Collateral | | 📁 Business development | | 28 | 1 | Timothy Steven.. | ☐ | Created: Mon Feb 25, 2010 |
| ▸ Departments | | 📁 Creative work | | 6 | 0 | Barbara Gordon | ☐ | Last updated: Tues Dec 10, 2010 |
| ▸ Office | | 📁 Human resource docs | | 4 | 0 | Stuart Robertson | ☐ | 28 Collaborators |
| ▸ IA materials | | 📁 IA materials | | 23 | 4 | Megan Thomas | ☐ | David Lee Owner |
| ▸ Marketing stuff | | 📁 Marketing stuff | | 78 | 6 | Steven Wilshire | ☑ ▶ | Kevin Tu Co-Owner |
| ▸ Strategy | | 📁 Strategy | | 2 | 0 | Rebecca Molatov | ☐ | David Tong |
| ▸ Usability research | | 📁 Usability research | | 15 | 2 | Alexander Jack.. | ☐ | Michael Smith |
| ▸ Applications | | 📁 Annual report.docx | | 37 | 4 | Jessica Dwyer | ☐ | David Lee |
| ▸ Business development | | 📁 2010_hires_orientation… | | 52 | 6 | Johnathon Gug.. | ☐ | 7 more collaborators ▾ |
| ▸ Creative work | | | | | | | | Enter names or emails here |
| ▸ Human resource docs | | | | Show 500 more | | | | 👥 Invite Collaborators |
| ▸ IA materials | | | | | | | | 6 Groups |
| ▸ Marketing stuff | | | | | | | | Creative |
| ▸ Strategy | | | | | | | | Business Development |
| ▸ Usability research | | | | | | | | Marketing |
| ▸ Applications | | | | | | | | 3 more groups ▾ |
| | | | | | | | | Enter group names here |
| Folder tree: Export / Print | | | | | | | | 👥 Invite Groups |

CENTRAL MANAGEMENT AND CONTROL OF USER-CONTRIBUTED CONTENT IN A WEB-BASED COLLABORATION ENVIRONMENT AND MANAGEMENT CONSOLE THEREOF

CROSS REFERENCE TO RELATED APPLICATIONS

This application claims the benefit of U.S. Patent Application No. 61/538,782 entitled "CENTRAL MANAGEMENT AND CONTROL OF USER-CONTRIBUTED CONTENT IN A WEB-BASED COLLABORATION ENVIRONMENT AND MANAGEMENT CONSOLE THEREFOR" which was filed on Sep. 23, 2011, the contents of which are all incorporated by reference herein.

This application is further related to U.S. patent application Ser. No. 13/152,982 entitled "Real Time Notification Of Activities that Occur In A Web-Based Collaboration Environment", which was filed on Jun. 3, 2011, the contents of which are all incorporated by reference herein.

BACKGROUND

As digital content has become dominantly used in enterprise settings or other environments as the preferred mechanism for project, task, and work flow management, the technology surrounding streamlined collaboration and editing of digital content among groups of users has become an area of active development.

In content management for enterprise settings or similar environments, numerous users are editing, sharing and accessing digital content and files in a shared online work space; as such, content management, version control, and permission tracking are examples of issues that need to be addressed.

BRIEF DESCRIPTION OF THE DRAWINGS

Figure 7:
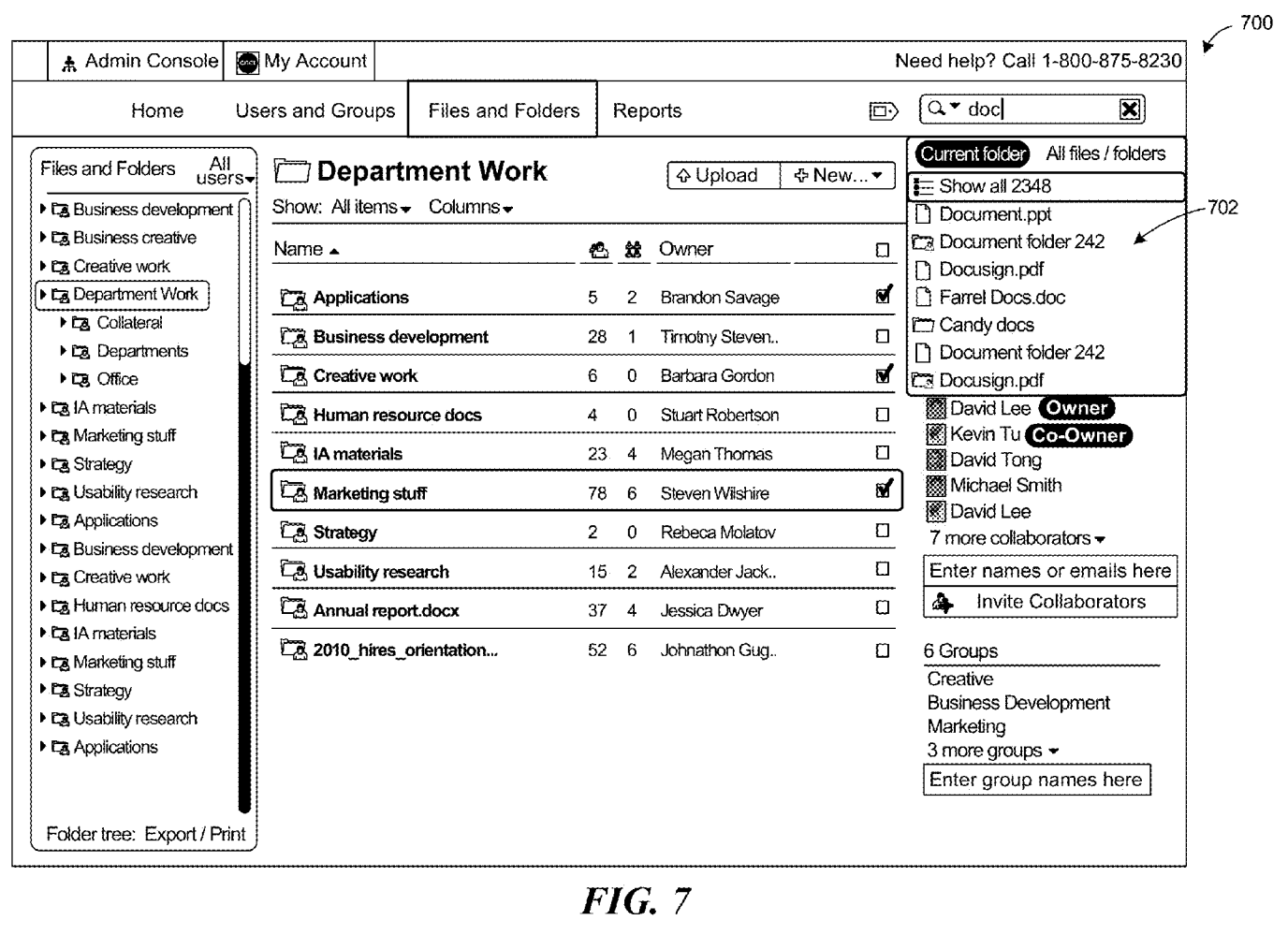
Figure 9:
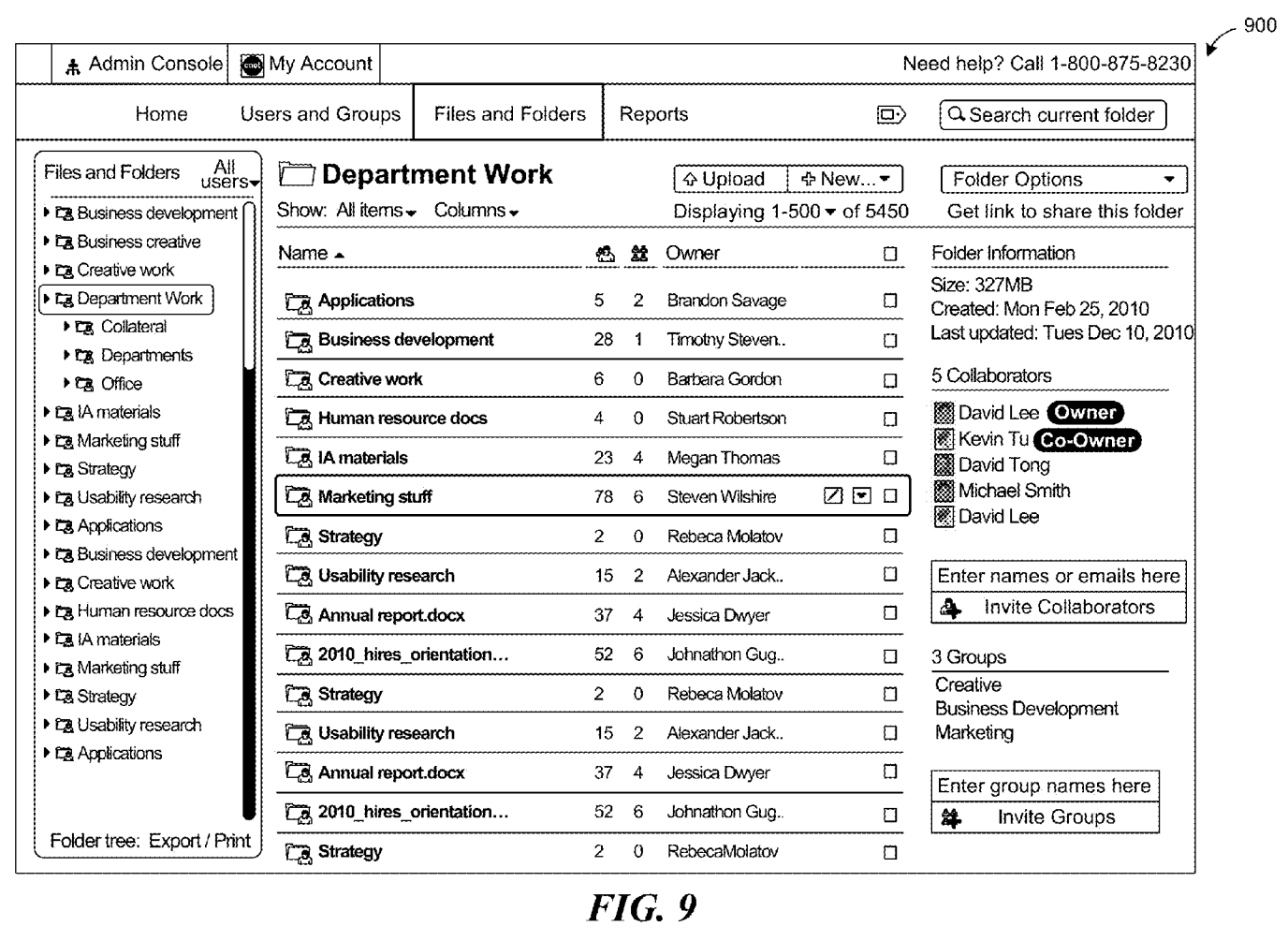

FIGS. 6-9 depict screenshots showing examples of views in a management console selectively enabled in a web-based collaboration environment for a verified administrator via a user interface through which the administrator user can also access to view or his/her own account.

FIGS. 10-11 depict screenshots showing examples of views in a management console showing features enabling the administrative user to manage users or collaborators or content contributors in workspaces.

Figure 14:
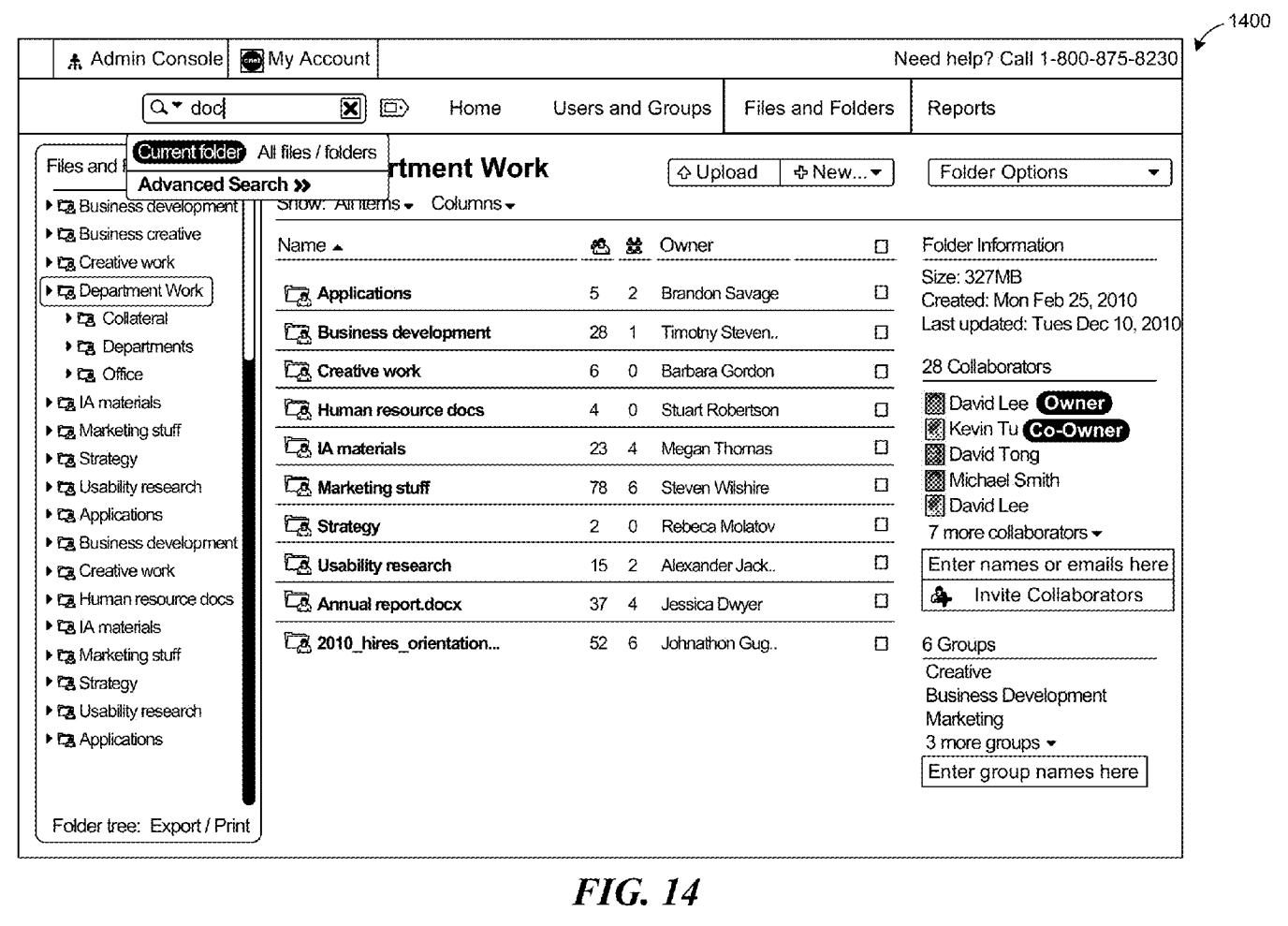
Figure 15:
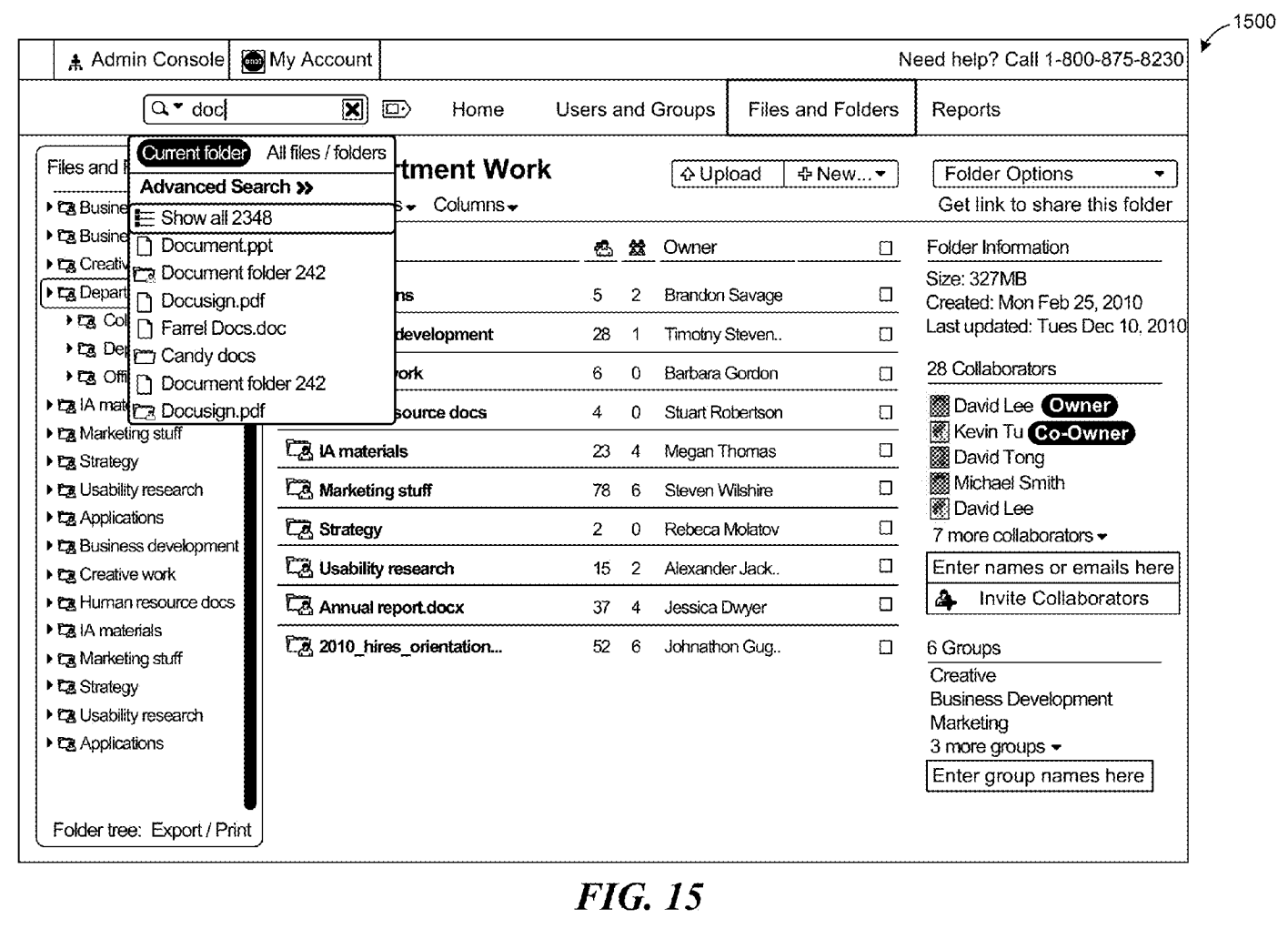
Figure 16:
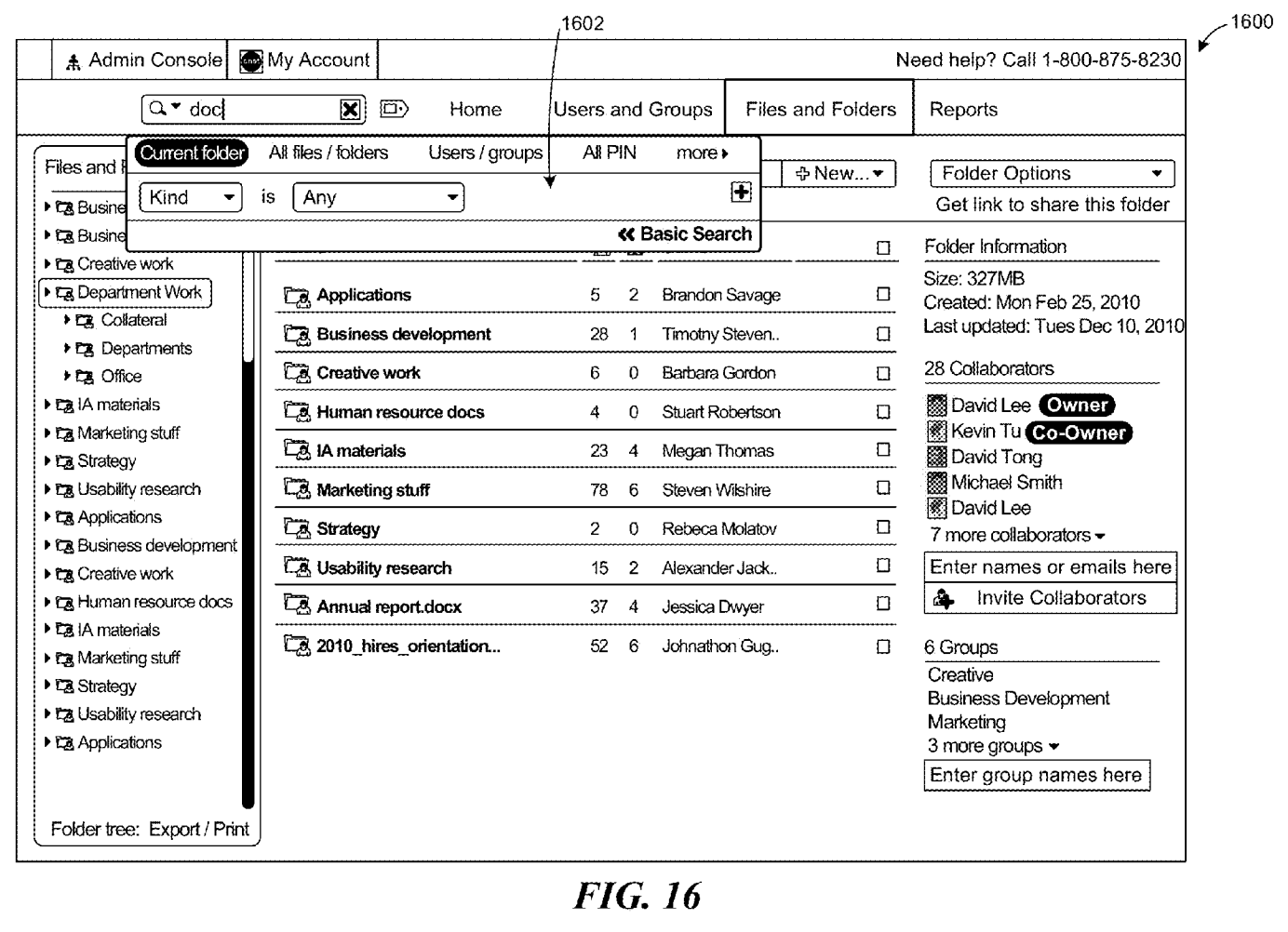

FIGS. 12-16 depict screenshots showing examples of views in a management console showing features enabling the administrative user to filter or selectively view sets or subsets of content aggregated among other users from one or more workspaces in a web-based collaboration environment.

Figure 17:
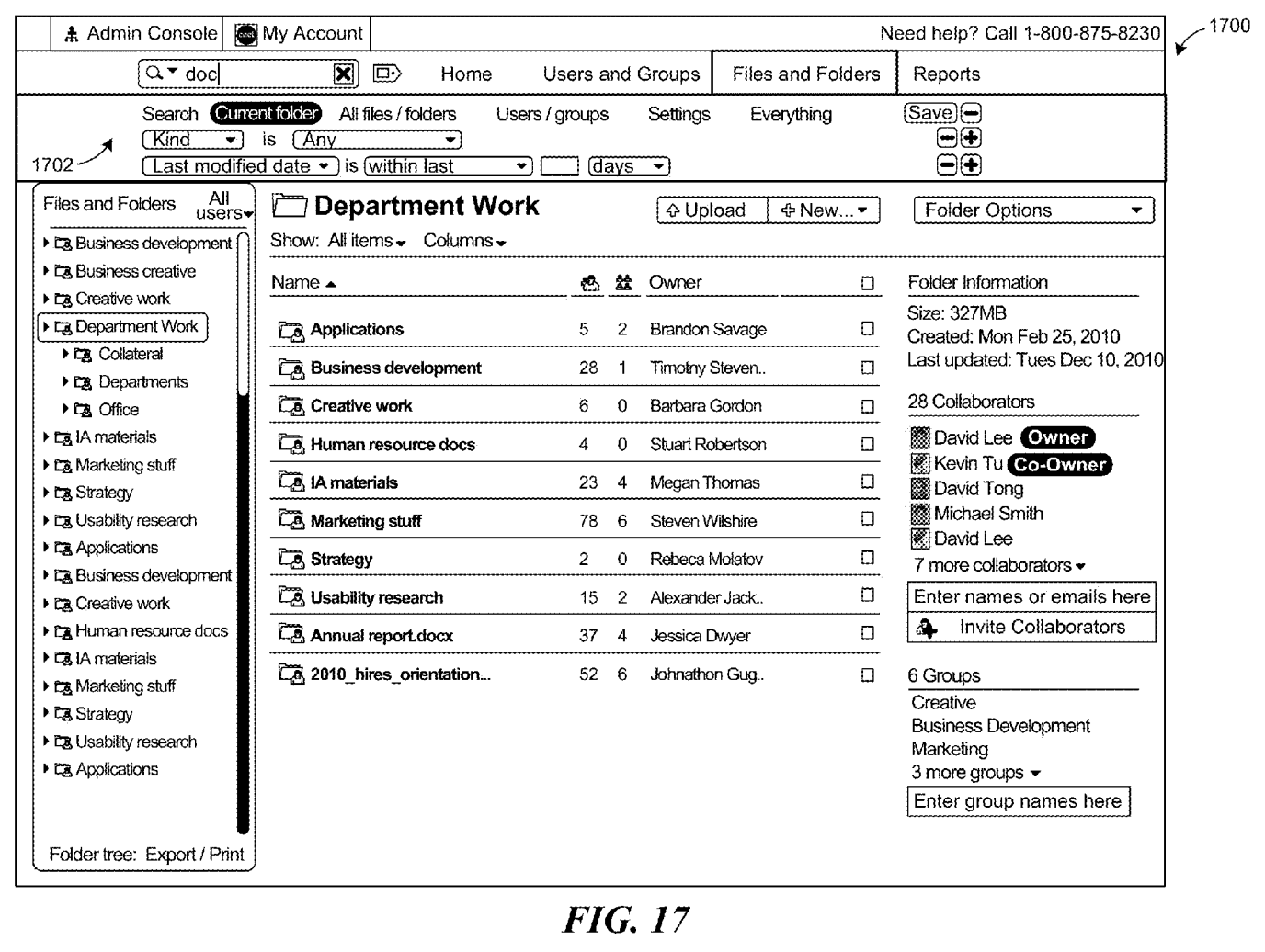

FIGS. 17-21 depict screenshots showing examples of views in a management console showing features enabling the administrative user to use various search parameters or terms to search for subsets of content aggregated among other users in a web-based collaboration environment.

DETAILED DESCRIPTION

Figure 1:
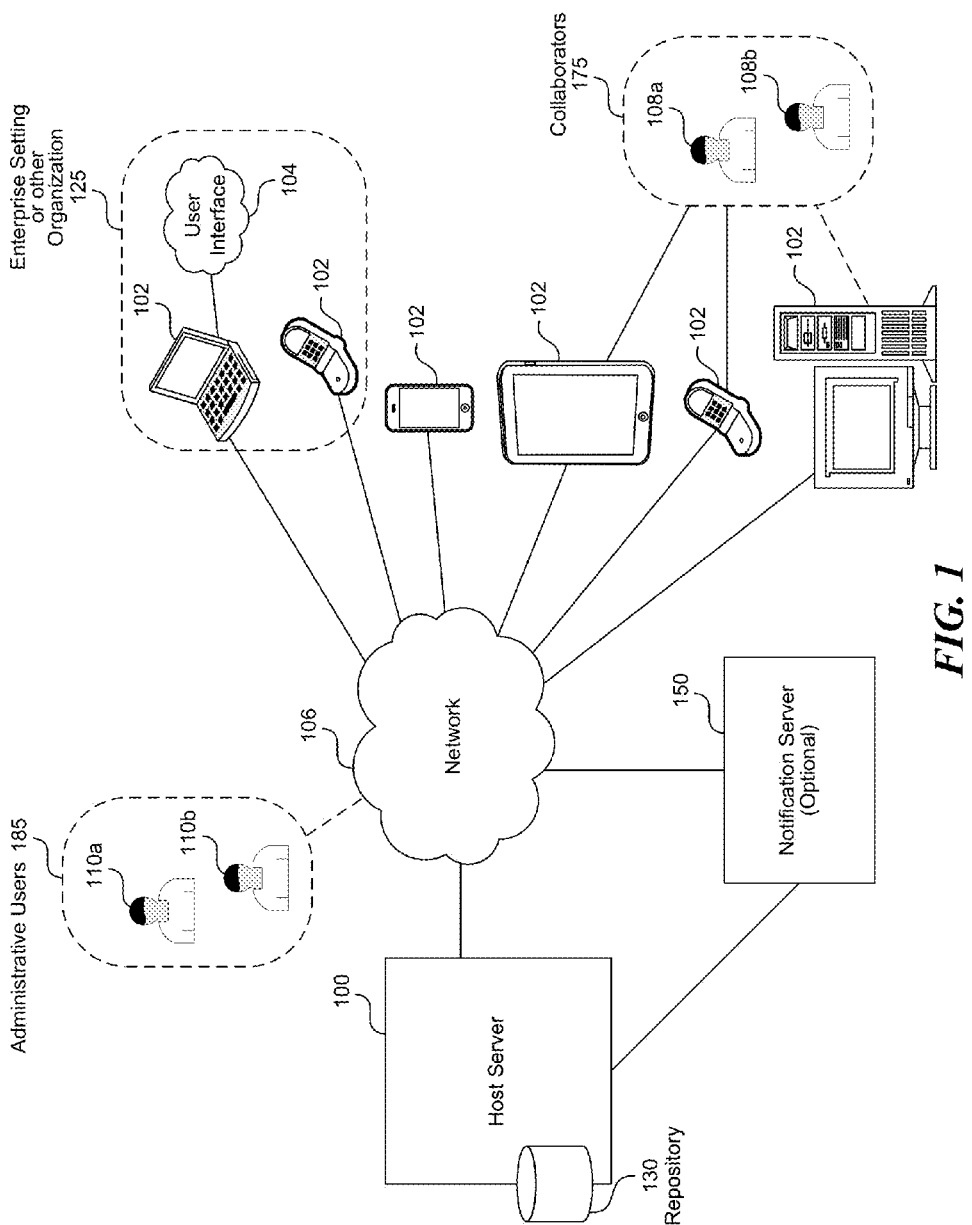
FIG. 1 illustrates an example diagram of a system having a host server able to provide a centralized management and control mechanism of user-contributed content in a web-based collaboration environment by authorized users (e.g., administrative users).

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for the central management and control of user-contributed content in a web-based collaborative environment and management console provided therefor.

FIG. 1 illustrates an example diagram of a system having a host server 100 able to provide a centralized management and control mechanism of user-contributed content in a web-based collaboration environment by authorized users (e.g., administrative users 185).

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the client devices 102, host server 100, and notification server 150 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users, administrator users 185 or collaborators (e.g., collaborators 108) for accessing, through network 106, a web-based collaboration environment or online collaboration platform (e.g., hosted by the host server 100 with notification capabilities (e.g., real time or near real time) enabled through the optional notification server 150).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102).

The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user (author or creator of the content) or an administrative user 185, or a general collaborator 175, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Administrative user(s) 185 can be associated with a single work space or multiple work spaces. Administrative users 185 may be users having administrative rights to content contributed by other users in a given workspace or across multiple work spaces. For example, an administrative user 185 may be a department manager in an enterprise or similar organization who oversees several projects and assigns/monitors tasks performed by several collaborators. An administrative user 185, may, manage, edit, access content provided by other users through the collaboration platform. Administrative users 185 may also manage collaborative users 175, for example, by monitoring, reviewing their work items, work status, assignments, and/or change/assign/edit permissions of the collaborative users 175 with respect to documents and work items in one or more work space. Further use cases can include eDiscovery applications using account-wide search enabled for administrative users.

Figure 2:
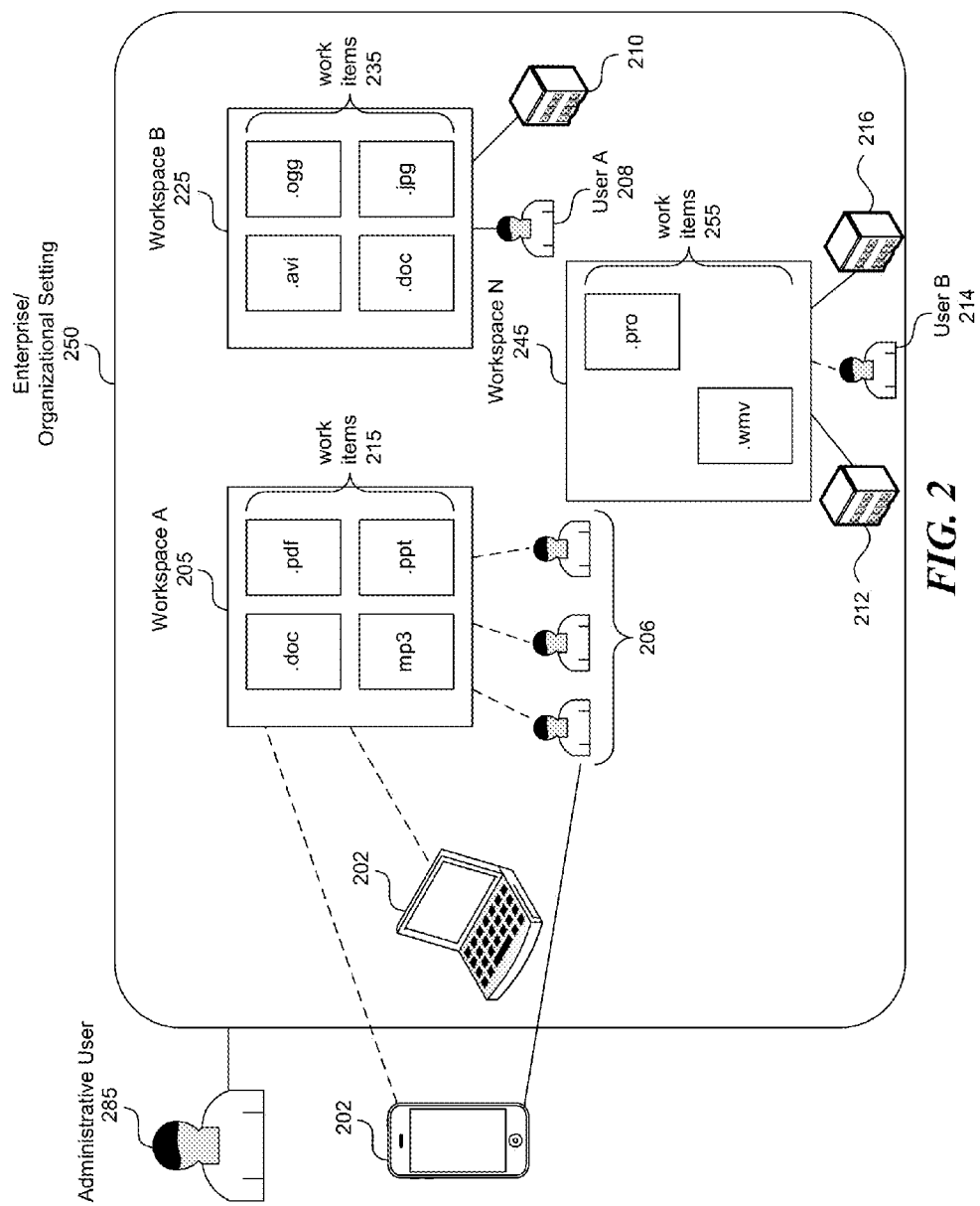
FIG. 2 depicts an example diagram of a web-based or online collaboration platform deployed in an enterprise or other organizational setting for organizing work items contributed by users and managed by an administrative user.

A diagrammatic illustration of the online collaboration environment and the relationships between workspaces and users/collaborators/administrators are illustrated with further reference to the example of FIG. 2. A diagrammatic illustration of a workspace having multiple work items with which collaborators (e.g., users, administrators, and/or authors/creators) can access through multiple devices is illustrated with further reference to the example of FIG. 3.

In one embodiment, the host server 100 of the online or web-based collaboration environment provides enhanced mechanisms for centralized management and control of user-contributed content by a user who can play an administrative/management role with respect to some workspaces but not in others. The web-based collaboration environment can provide a user interface having a segmented view between a management console and a user console.

For workspaces which the user is an administrator or manager, the user can, through the management console activated in the user interface through the collaborative environment, access, manage, edit, and/or monitor content provided by other users (e.g., content relating to a given project, within a certain department, topic, organization, or enterprise). The administrative user can also, through the management console, track, monitor users or collaborators across one or more workspaces in the online collaboration environment.

For workspace which the user is not an administrator, the user may access the user console through the same interface to access the associated content and/or interact with the associated collaborators. The segmented view in a common user interface allows, for example, a user to manage multiple affiliations and associated content/collaborators, either with a given work space in the collaboration environment, or with multiple enterprises/organizations, through the web-based collaboration environment.

Note that through the user interface, the administrative user can also access a non-management console view to access his/her own content in a separate work space or context in which he/she may not play an administrative or management role, either in the web-based work space or in an actual physical enterprise/environment.

In other words, the segmented administrator and user views enable the decentralization and management of roles by a user using a single account. In this manner, the user need not establish multiple accounts (e.g., different log-in information) for different affiliations and/or to access different work items with different work space affiliations. For example, a given administrator can login to the collaboration environment using a single account to access a project for which he/she is managing (and also managing the associated content and other users) and at the same time, using that same account to access projects or work spaces where the user is just a contributor or collaborator, and not managing the content, project, or other users. The projects accessed through the segmented views may have the same or different enterprise organization affiliations.

Functions and techniques disclosed for centrally managing and controlling user-contributed content and other users via a management console are further described with reference to the components illustrated in the example of FIG. 4.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, text messaging (SMS), and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in a given enterprise or other organizational setting 250 for organizing sets of work items 215, 235, 255 in workspaces 205, 225, 245 contributed by users 206, 208, and 214 and managed by an administrative user 285.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized formal or informal setting, such as a group of users with no-specific (common) formal organizational or enterprise affiliation.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In some instances, a given work space (e.g., work space A 205) may have an administrative user (e.g., administrative user 285) who manages the associated work items (e.g., work items 215) contributed or provided by other users (e.g., users 206) and/or the affiliated users. The administrator 285 may also manage multiple work spaces (e.g., work spaces A, B, etc) and/or the contributing/associated users, etc. Through the collaboration environment, a user with an administrative role can access and manage an aggregate of content provided by the other users. The administrative user can also manage other users and user groups through the collaboration environment, via a management console.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Such notifications can be sent to relevant users and/or any administrators to notify them of actions surrounding such activities.

Example user interfaces for accessing the collaborative environment or platform and the central management and content control mechanisms are illustrated with references to the example screenshots of FIGS. 6-21.

Figure 3:
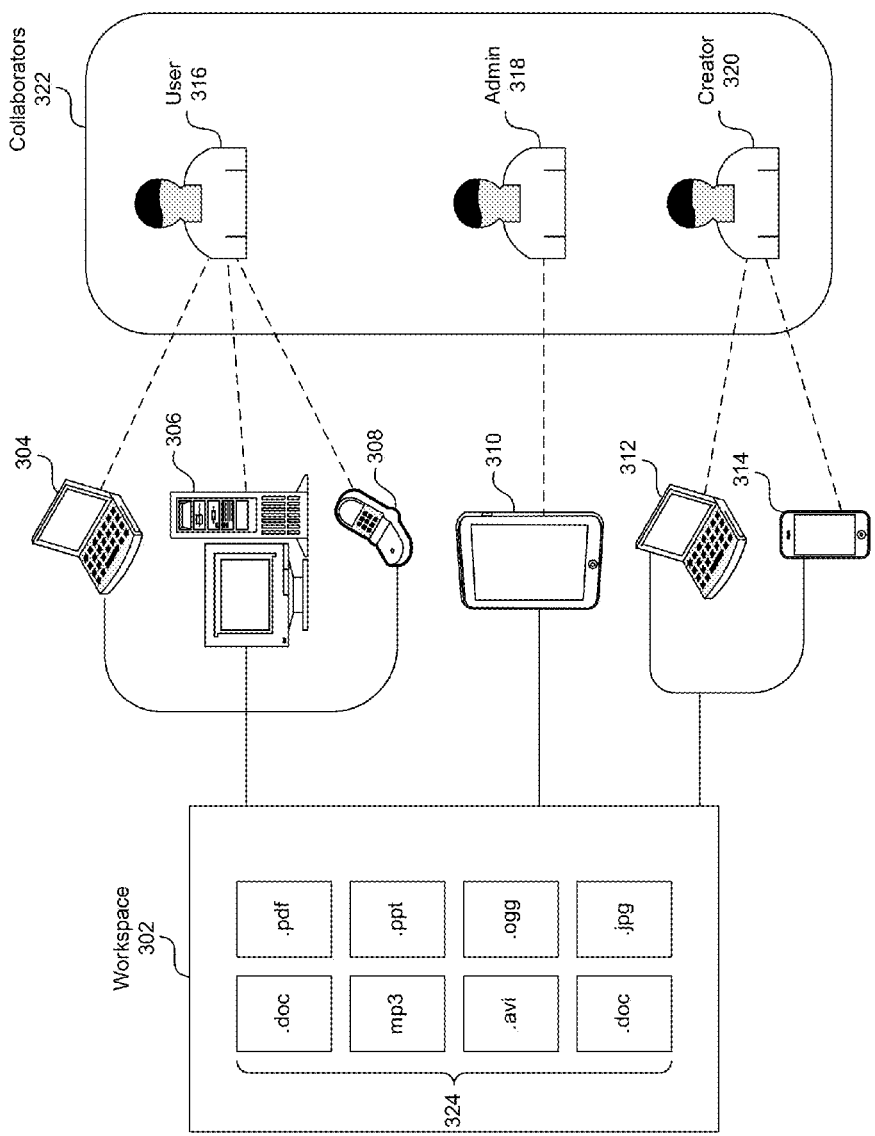
FIG. 3 depicts an example diagram of a workspace in an online or web-based collaboration environment accessible by collaborators including a creator (author), administrative user, or general user, through various devices.

FIG. 3 depicts an example diagram of a workspace in an online or web-based collaboration environment accessible by collaborators including a creator (author) 320, administrative user 318, or general user 316, through various devices.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device). The admin user 318 can access the work items in the work space 302 provided by other users (e.g., user 316 and/or creator 320), and/or edit or perform other actions in accordance with admin rights via a management console through the collaboration work space. Tasks, jobs in the work space 302 can also be managed by the admin user 318 (e.g., monitor progress, assign tasks, review comments, review revisions, etc.) through the management console.

Figure 4:
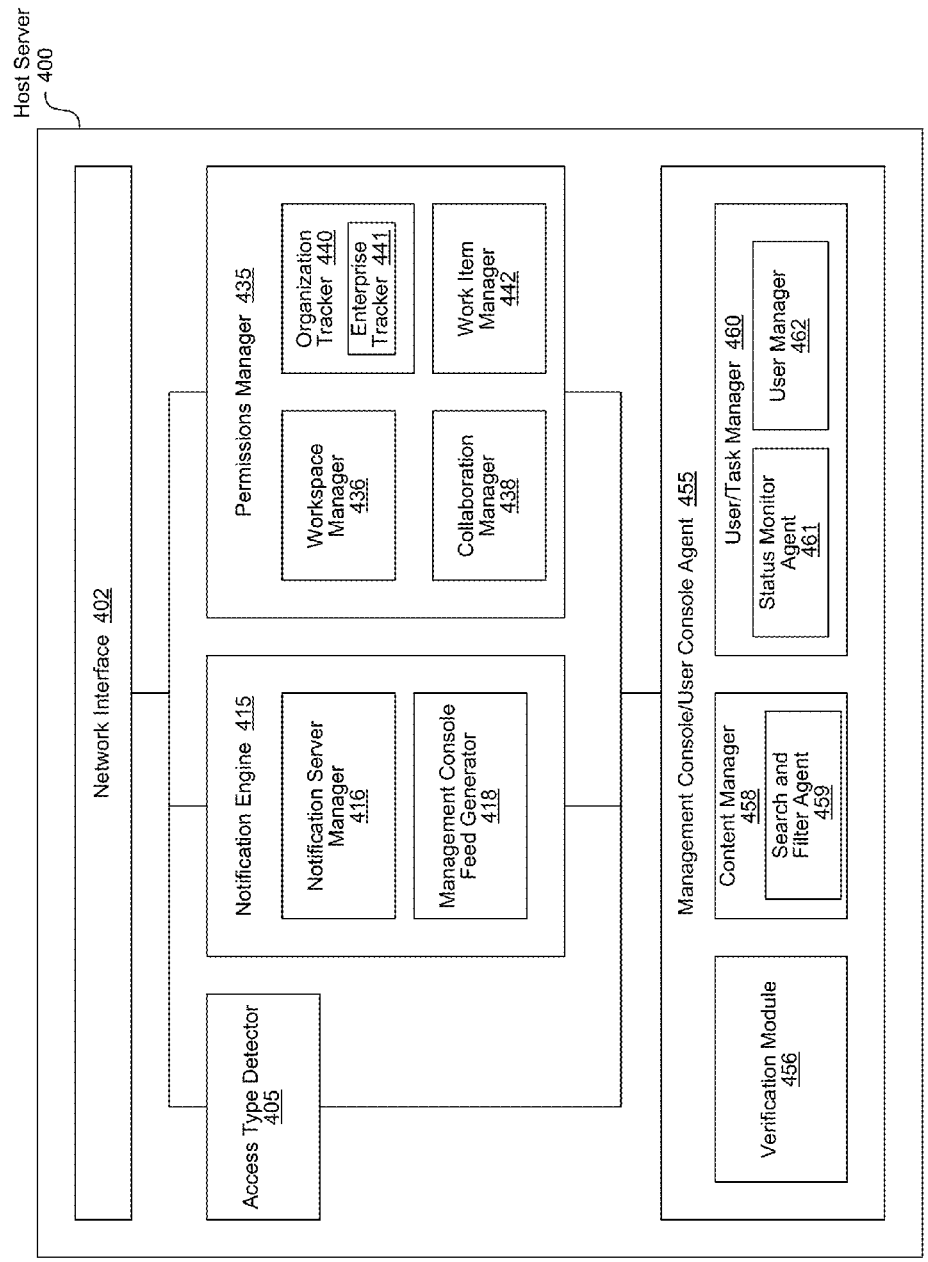
FIG. 4 depicts a block diagram illustrating an example of components in the host server of a web-based collaboration environment which provides central management and control of user-contributed content and management console.

FIG. 4 depicts a block diagram illustrating an example of components in the host server 400 of a web-based collaboration environment with provides central management and control of user-contributed content and management console.

The host server 400 of the web-based or online collaboration environment can generally be a cloud-based service. The host server 400 can include, for example, a network interface 402, an access type detector 405, a notification engine 415 having a notification server manager 416 and/or a management console feed generator 418. The host server 400 can further include a management console/user console agent 455 having a verification module 456, a content manager 458 having a search/filter agent 459, a user/task manager 460 having a status monitor agent 461 and/or a user manager 462.

Additional or less components/modules/engines can be included in the host server 400 and each illustrated component.

The network interface 402 can be a networking module that enables the host server 400 to mediate data in a network with an entity that is external to the host server 400, through any known and/or convenient communications protocol supported by the host and the external entity. The network interface 402 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," "a handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. §101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 400 includes the access type detector 405 which can receive, detect, process, identify, a user request and categorize it as either an administrative request or a general user request.

An administrative request includes a request from a user with management or other administrative roles, either in the collaborative environment online or in the physical organization or enterprise. The access request can be received from a user (e.g., through UI features in a user interface, such as that one shown in the examples of FIGS. 6-7) to select to access the administrator's console or the user console.

Administrative requests include those by an administrative user to centrally manage or control an aggregate of content provided by other users, such as users in one or more work spaces in the online environment, which can correspond to users which share a common affiliation in real life (e.g., collaborators in the same project, belonging to the same department, major, organization, sub-organization, sub-group, enterprise, local office of a company, common seniority, etc.). Administrative requests include a request from a user to view, edit, organize, or otherwise access an aggregate of content provided by or contributed by other users.

A general user request can include requests to upload the user's own content (authored or created content), edit uploaded content, review, or edit content provided by other collaborators. In response to detecting an administrative request, the system can initially verify that that the user has permission to manage or access the aggregated content provided by other users in a given setting (e.g., in a specific work space, group of work spaces, or content associated with a physical organization, enterprise, or other types of groups).

For example, the request, once categorized as a general user request or as a administrator request, can be passed on to the management console/user console agent 455. If the request is detected as an admin request, the verification module 456 can determine, verify, confirm, whether the user has administrative rights to manage content or an aggregate of content provided by the other users in a given setting. The verification module 456 can verify such rights based on identification of the user using the user's login credentials and user data stored for the user in the system (e.g., repository 130 of the example of FIG. 1).

Administrative rights may be assigned by management of a given enterprise, with which the work space is relevant, or any other user or member of the web-based collaboration environment or real-life organization or group of affiliated people. Administrative rights may be assigned by the admin user him/herself. Alternatively or in addition, administrative rights may be assigned to one or more users by a collaborator in a given work space. In general, the user and the other users are affiliated with a common organization and the administrative user in the online platform also assumes an administrative role in the common organization. Such rights and relationships can be indicated in user profiles stored in the system.

When admin rights have been confirmed or verified for a user, the management console/user console agent 455 can depict, in a user interface, for the user to access the web-based collaboration environment, a view providing access to an aggregate of content provided by the other users. Via the view (e.g., a 'management console'), the user is able to selectively access a subset of the aggregate of the content by applying filtering mechanisms through the user interface to manage the content (e.g., via the content manager module 458).

Figure 6:
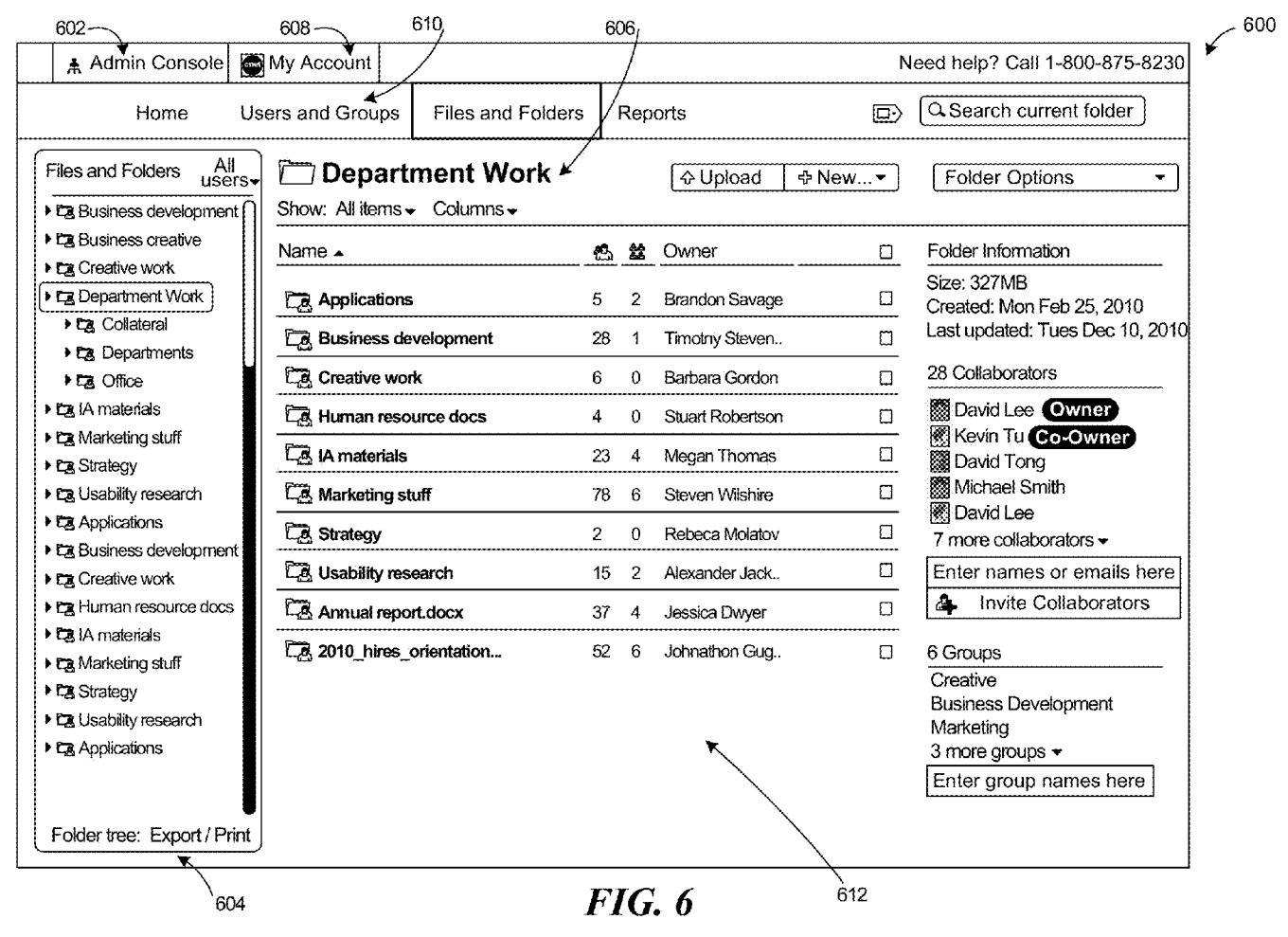

The view depicted in the management console can include the aggregate of content provided by the other users presented as a list of files or folders for the administrative user to view, access, monitor, review, or edit, for example, as shown in the panel 604 in the example screenshot of FIG. 6. In one embodiment, the management console further includes filtering mechanisms to allow the admin user to access content associated with a specific user of the other users, for example, by the search and filter agent 459. The filtering mechanisms can allow the user to access content associated with a specific workspace or specific projects, for instance. The user can able to access individual work items in the aggregate set of content provided by other users in the web-based collaboration environment. The access rights of an administrative user can include one or more of, by way of example, view, edit, assign task, delete, preview, download content, files, or folders. The access rights can further include, uploading or creating work items in a work space associated with other users.

Examples of the filtering and search mechanisms are shown in the example screenshots of FIGS. 17-21.

The management console also further includes group management features which allow the user to manage user groups among the other users, for example, via the user/tasks manager module 460 or the user manager module 462 therein. The user can also, through the management console, manage one or more of the other users that provided the content, for example, by changing or updating access permissions of the individual work items in the aggregate set of content. The screenshot of FIG. 6 depicts a panel 610 in the admin console through which the administrative user can access and manage users and groups. For example, the admin user can view a listing of all users or collaborators within work spaces for which the user is the administrator. The admin user can also view, edit, create user groups within or affiliated with work spaces that they are admin users for. For example, the admin user can manage user groups by adjusting group associations, memberships, permissions, or access rights to content based on the permissions. In one embodiment, groups allow the bulk assigning of users to access rights.

In addition, the management console allows users to assign tasks in a work space to other users (e.g., another user or collaborator in a work space), for example, facilitated by the user/task manager 460. In one embodiment, through the status monitor agent 461, the administrative user is able to monitor the status of individual work items or assigned tasks. The administrative user may also be able to perform changing or updating access permissions of the individual work items in the aggregate set of content.

One embodiment of the host server 400 includes a notification engine 455. The notification engine 455, can for example, update a feed stream in the management console for the administrative user, for example, via the management console feed generator 418. In some instances, the feed stream can be optionally updated in real time or near real time relative to when the action relative to a work item, work space, or user is performed, initiated, saved, shared, and/or completed. For real-time updating, the notification engine 455 can utilize another server, or another engine in the same server which provides push functionality.

The notification engine 455 can generally notify users, which can be collaborators of the user who performed the activity in the work space, in addition to one or more administrator users, via one or more of many mechanisms, including but not limited to, email, SMS, voice-message, text-based message, RSS, feed, etc., as described in detail with further reference to related co-pending U.S. patent application Ser. No. 13/152,982 filed on Jun. 3, 2011. The contents of which are incorporated herein by reference in its entirety.

In one embodiment, the notification is depicted through a web-browser used by the other user (e.g., another collaborator or one or more administrative users) to access the web-based collaboration environment, for access in real time or near real time, or in delay time to when the activity was performed by the user. When notifying a user in real time through a web-browser, the notification engine 415 can utilize a push-enabled service to ensure real time notification. In one embodiment, the notification is sent by a component or another server which implements push technology.

The push-enabled service can be implemented via long poll or HTTP streaming, for example, by the notification server 500 or another component, device which may be internal to or external to the host server 400. In addition, the host server 400 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.) The host server 400 can send a notification server an identification of the recipient or administrative user to be notified and indicator of the activity to notify the recipient of.

In general, recipients, including recipients who are administrative users, of an activity notification are selected based on criteria. The activities which an administrative user is notified of can also be determined by system-managed criteria. The criteria may be determined, for example, based on a work space in which the activity was performed in the online collaboration platform. Specifically, the criteria, is in one embodiment, determined based on permissions configured for the workspace, as managed, tracked, updated, implemented, revised, based on the permissions manager 435.

For example, the workspace can be associated with an enterprise and in such an instance, the criteria can specify that the recipient that is selected is an employee of the enterprise and is therefore an administrative user. Enterprise associations and affiliations can be managed by the organization tracker 440, for example; in some embodiments, enterprises and/or enterprise accounts can specifically be managed, tracked, monitored by the enterprise tracker 441.

Permissions for the workspace can be configured by a creator or administrative user of the workspace. Administrator designations are also tracked and stored in the permissions manager 435. The collaboration manager 438 can determine, track, and implement relationships, roles, and/or access levels of multiple users/collaborators. For example, users may be a general user, a creator of the work space, a creator of a work item, or an administrative user. The permissions for a work space can be configured by a user, creator, or the administrative user and is generally managed by the collaborations manager 438.

The criteria that are determined by work space permissions can be managed by the work space manager 436 in the permissions manager 435. A recipient selection criteria for recipients of notifications or other access rights can generally be based on user affiliation with the workspace, including, one or more of, member, invited collaborator and collaborator in the workspace. Such user affiliation can be tracked and managed by, for example, the collaboration manger 438 of the permissions manager 435.

In one embodiment, the criteria are determined based on permissions associated with a work item on which the activity was performed in relation to in the workspace. Permissions associated with work items can be managed, tracked, updated, revised, or implemented, in one embodiment, by the work item manager 442. For example, the permissions associated with the work item can be set by, a creator of the work item or an administrative user of the work space. Each work space can include multiple work items where each of multiple work items has individually configurable permissions. The individually configured permissions can be determined by user roles and rights (e.g., as managed by the collaborations manager 438). The work item manager 442 can communicate with the collaboration manager 438 in setting, configuring, or re-configuring permissions associated with work items.

Figure 5:
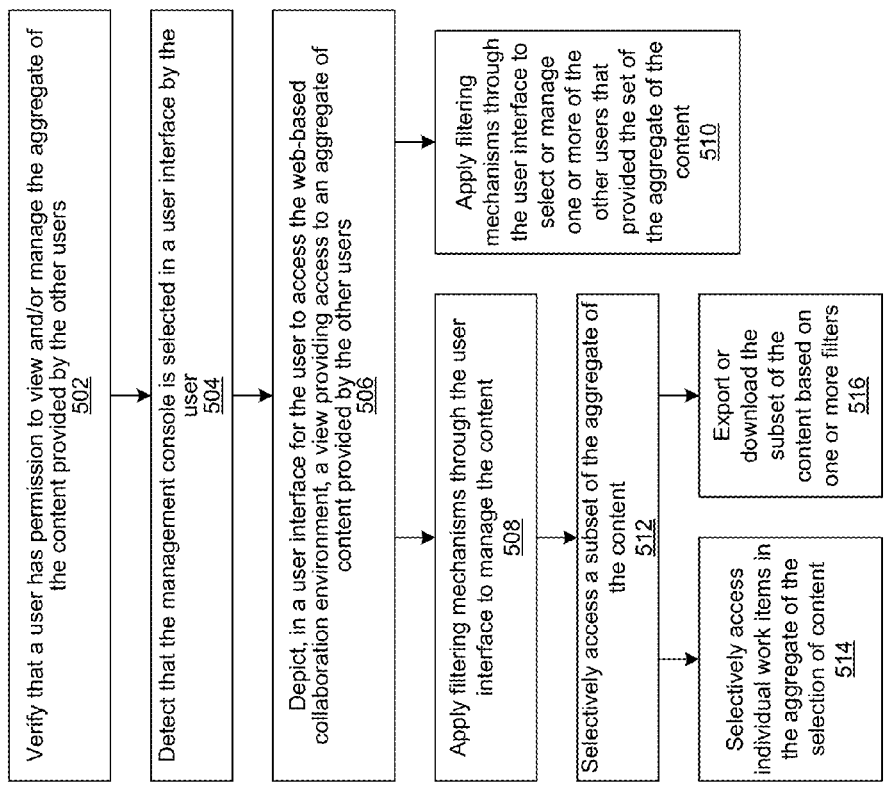
FIG. 5 depicts a flow chart illustrating an example process whereby an authorized user can centrally manage content provided by other users and/or other contributing users through a management console in the user interface of the web-based collaboration environment.

FIG. 5 depicts a flow chart illustrating an example process whereby an authorized user can centrally manage content provided by other users and/or other contributing users through a management console in the user interface of the web-based collaboration environment.

In process 502, it is verified that a user has permission to view and/or manage the aggregate of the content provided by the other users. In process 504, it is detected that the management console is selected in a user interface by the user. In process 506, a view providing access to an aggregate of content provided by the other users is depicted in a user interface for the user to access the web-based collaboration environment.

In process 508, filtering mechanisms are applied through the user interface to manage the content. The filters selected can include, by way of example but not limitation, search term, keyword, time, time range, user, owner, collaborator, date range, type of access, type of content, etc. In process 512, the administrative user can selectively access a subset of the aggregate of the content. Note that in some instances, separate permission settings or levels can be set for permission to view content, manage content, and/or aggregate content. In other words, administrative users can have rights to view users' content but not to filter and aggregate, or administrative users can have permission to view users' content. These permissions can vary based on use case, company requirements, and can be customized on a case by case basis.

In process 514, the administrative user can selectively access individual work items in the aggregate of the selection of content. One embodiment includes process 516, where, the user exports or downloads a subset of the content based on the applied filters. Similarly, in process 510, filtering mechanisms can be applied through the user interface to select or manage one or more of the other users that provided the set of the aggregate of the content.

FIGS. 6-9 depict screenshots showing examples of views in a management console selectively enabled in a web-based collaboration environment for a verified administrator via a user interface through which the administrator user can also access to view or his/her own account.

Screenshot 600 illustrates the management console view when the 'admin console' tab 602 is selected. Under this view, which is accessible to the administrative user, the files and folders panel 604 showing a hierarchy of aggregated content among multiple users can be accessed and used to selectively view content (e.g., shown in window 612). Alternatively, the user can, through user interface 600 select the 'my account' tab 608 and access his/her own account and the associated content and collaborators which can be independent of work spaces and content which the user has admin rights for.

Screenshot 700 depicts another example view of the management console showing panel 702 which allows the admin user to view the files in a selected folder of aggregated content from multiple users. Similarly, screenshots 800 and 900 depict additional examples of features provided to an admin user through the management console to access, edit, share, view, or otherwise manipulate content, files, or folders.

Figure 10:
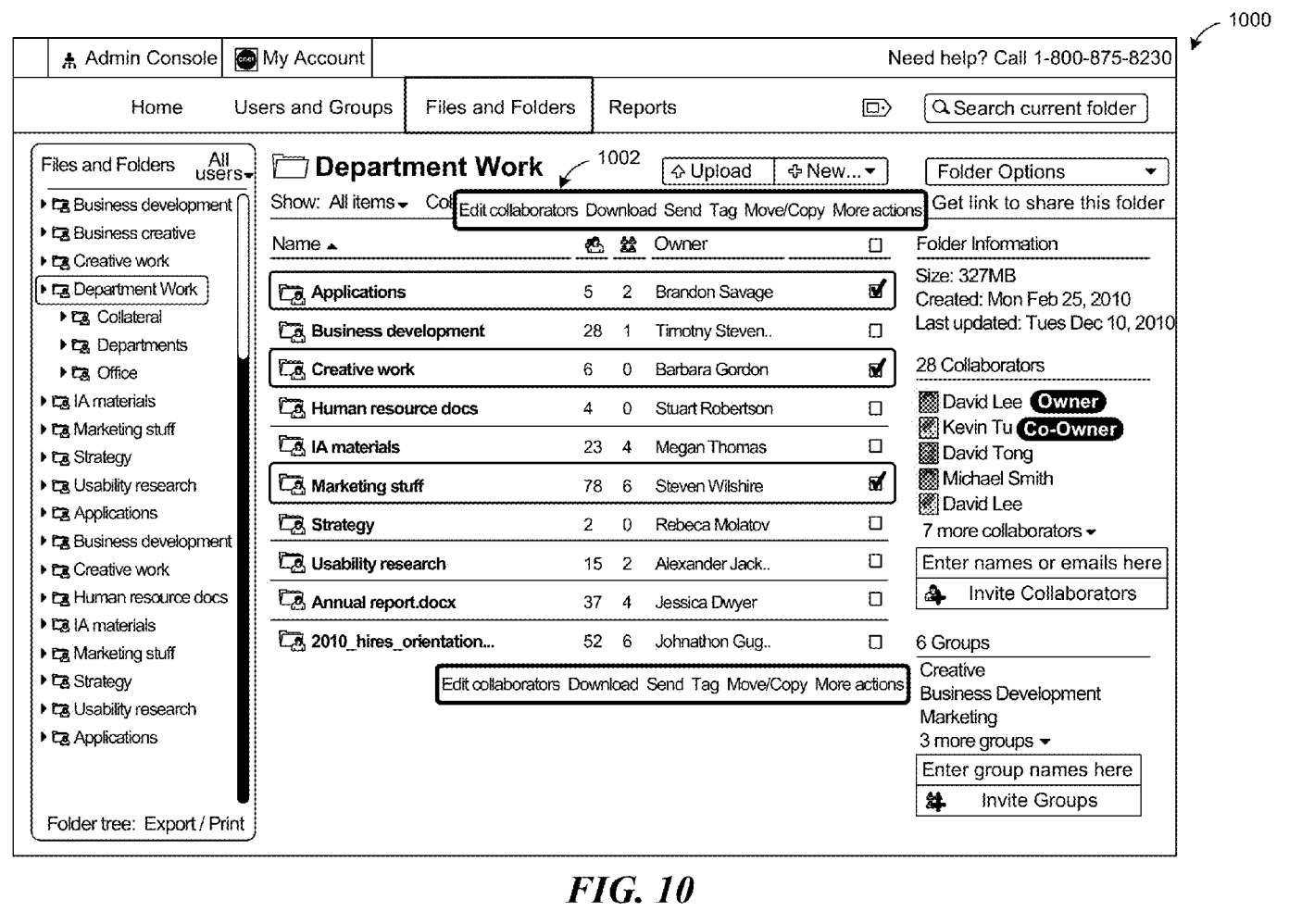
Figure 11:
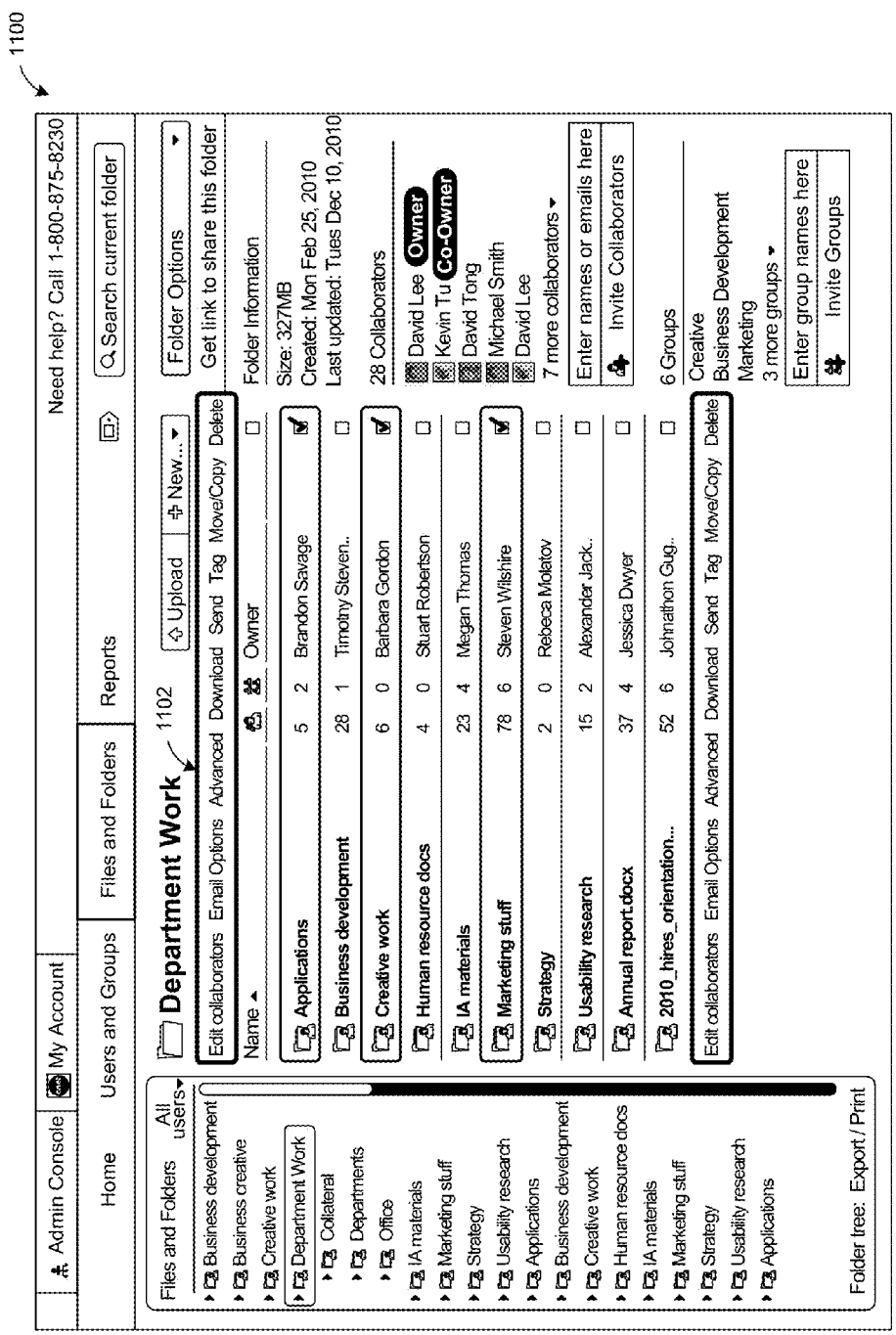
Figure 12:
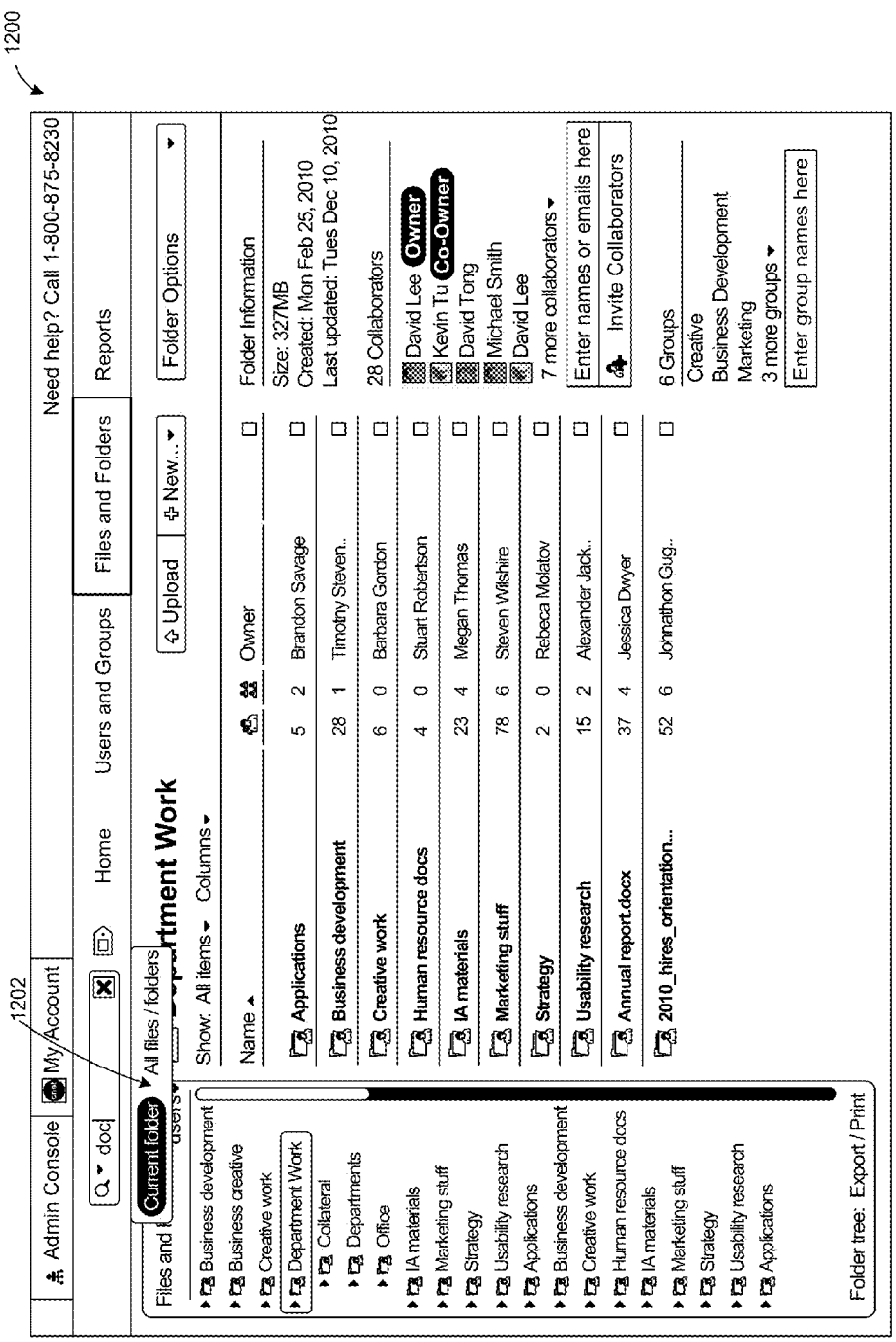
Figure 13:
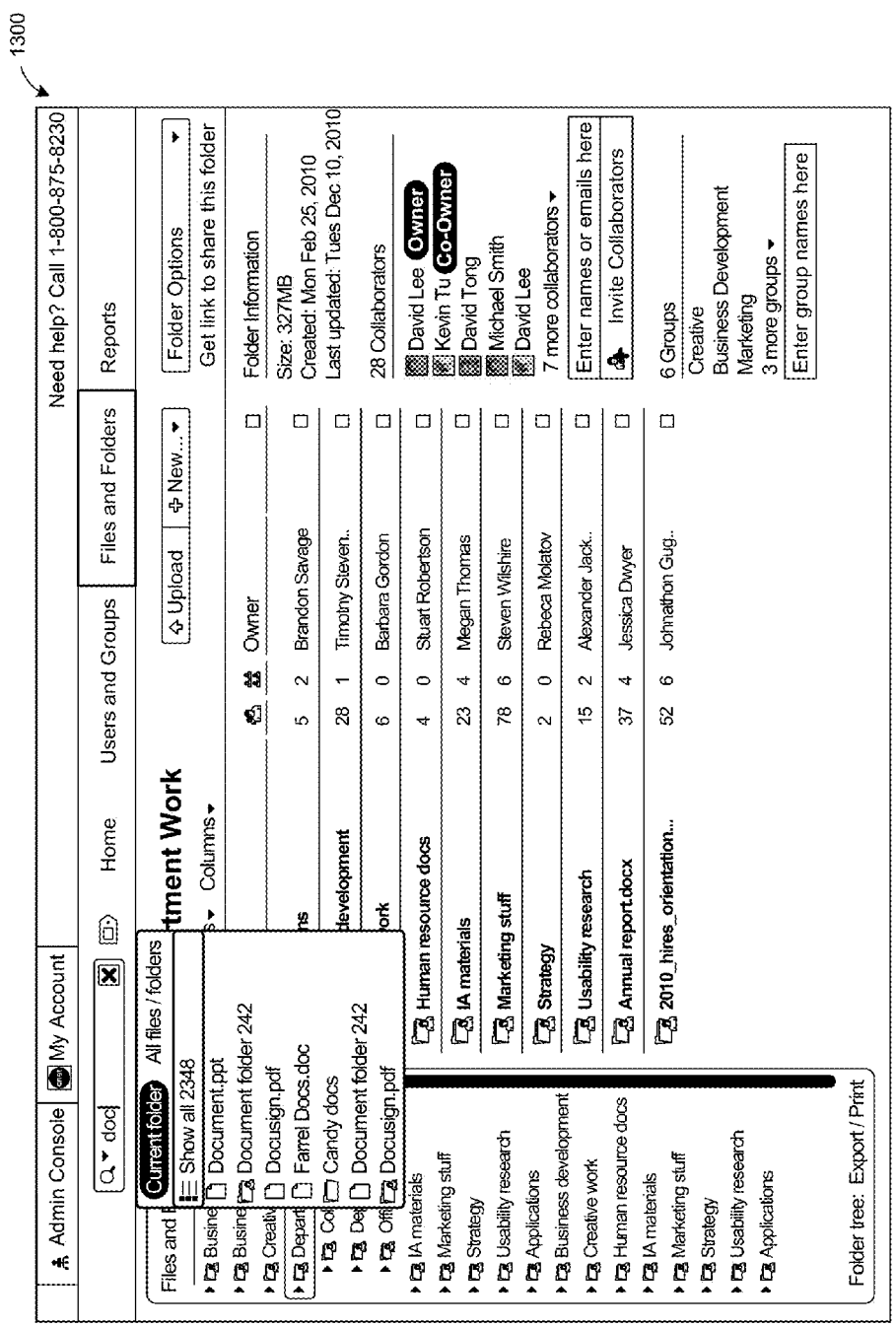
Figure 19:
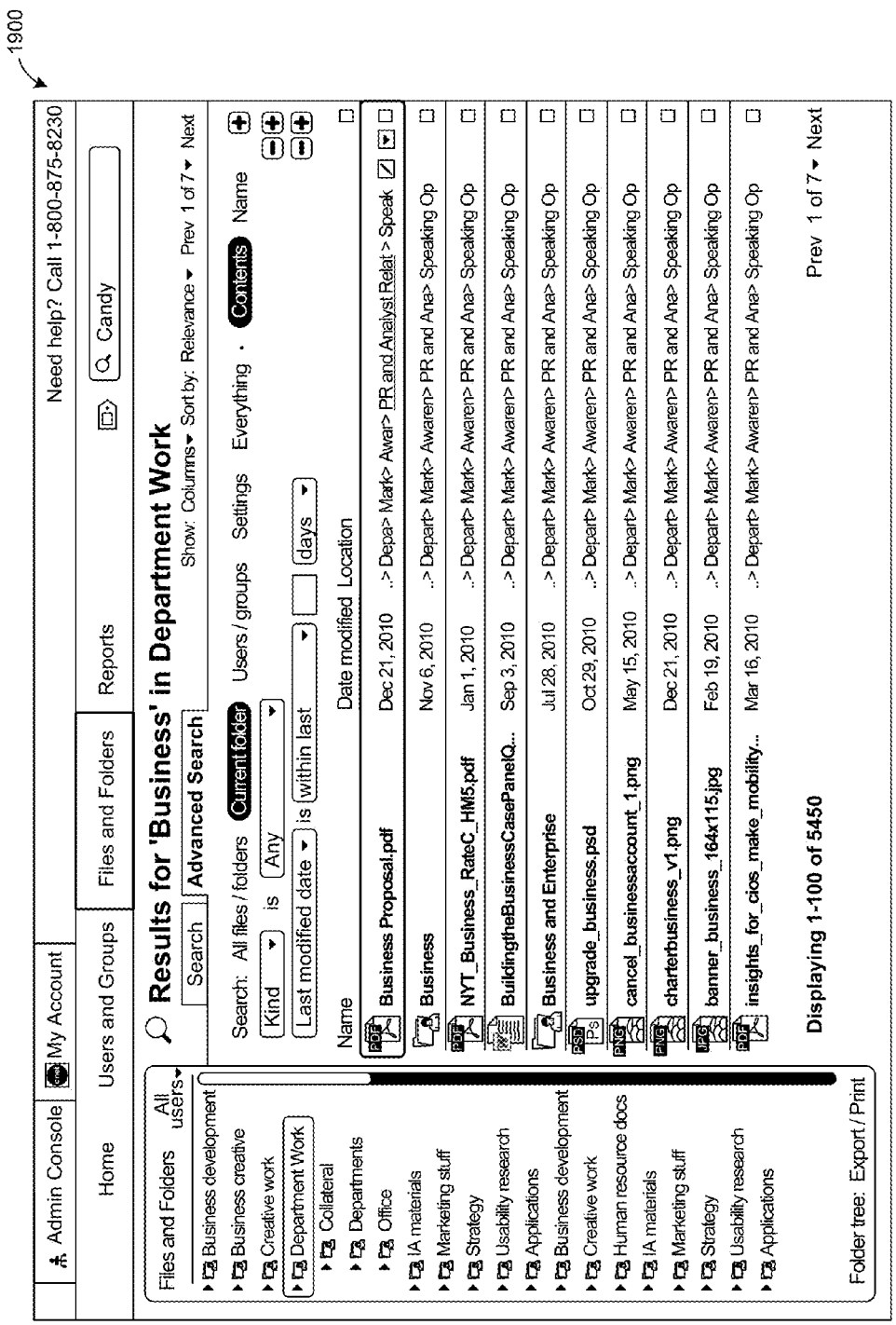

FIGS. 10-11 depict screenshots showing examples of views in a management console showing features 1002 and 1102 enabling the administrative user to manage users or collaborators or content contributors in workspaces.

FIGS. 12-16 depict screenshots showing examples of views in a management console showing features 1202 enabling the administrative user to filter or selectively view sets or subsets of content aggregated among other users from one or more workspaces in a web-based collaboration environment. Panel 1602 shown in the example of FIG. 16 allows the administrative user to search for files, users, or groups using basic search parameters.

Figure 18:
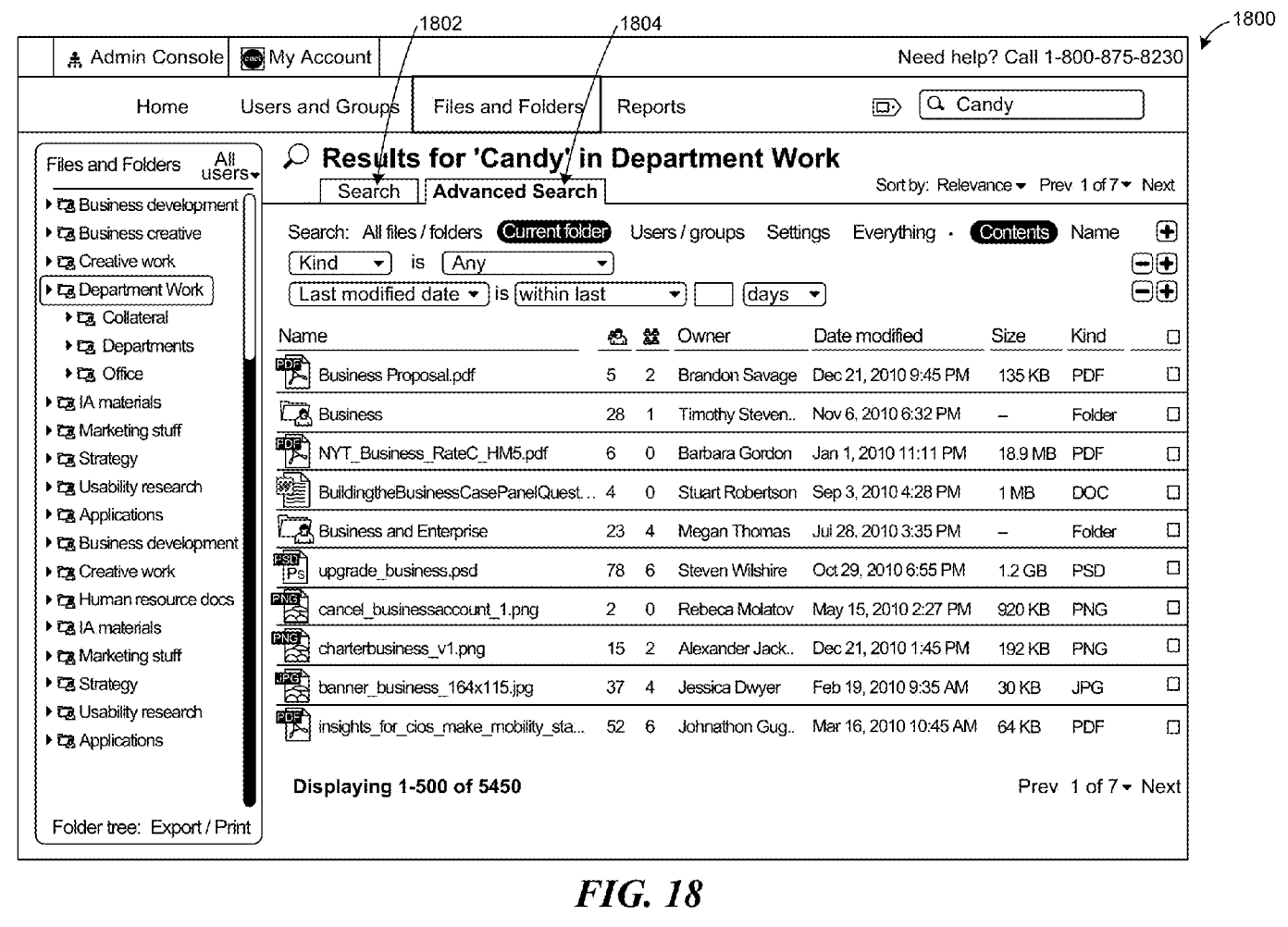
Figure 20:
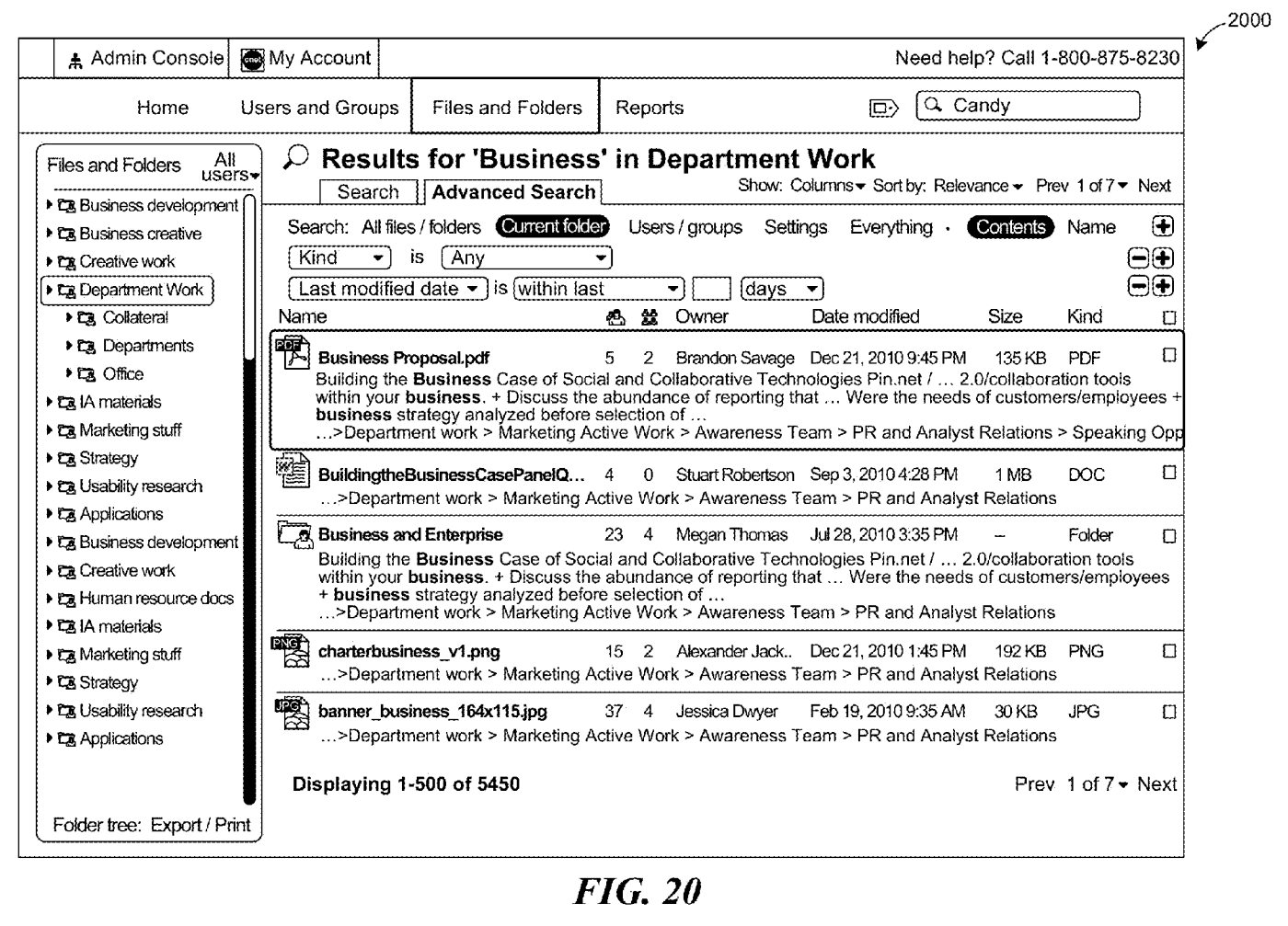
Figure 21:
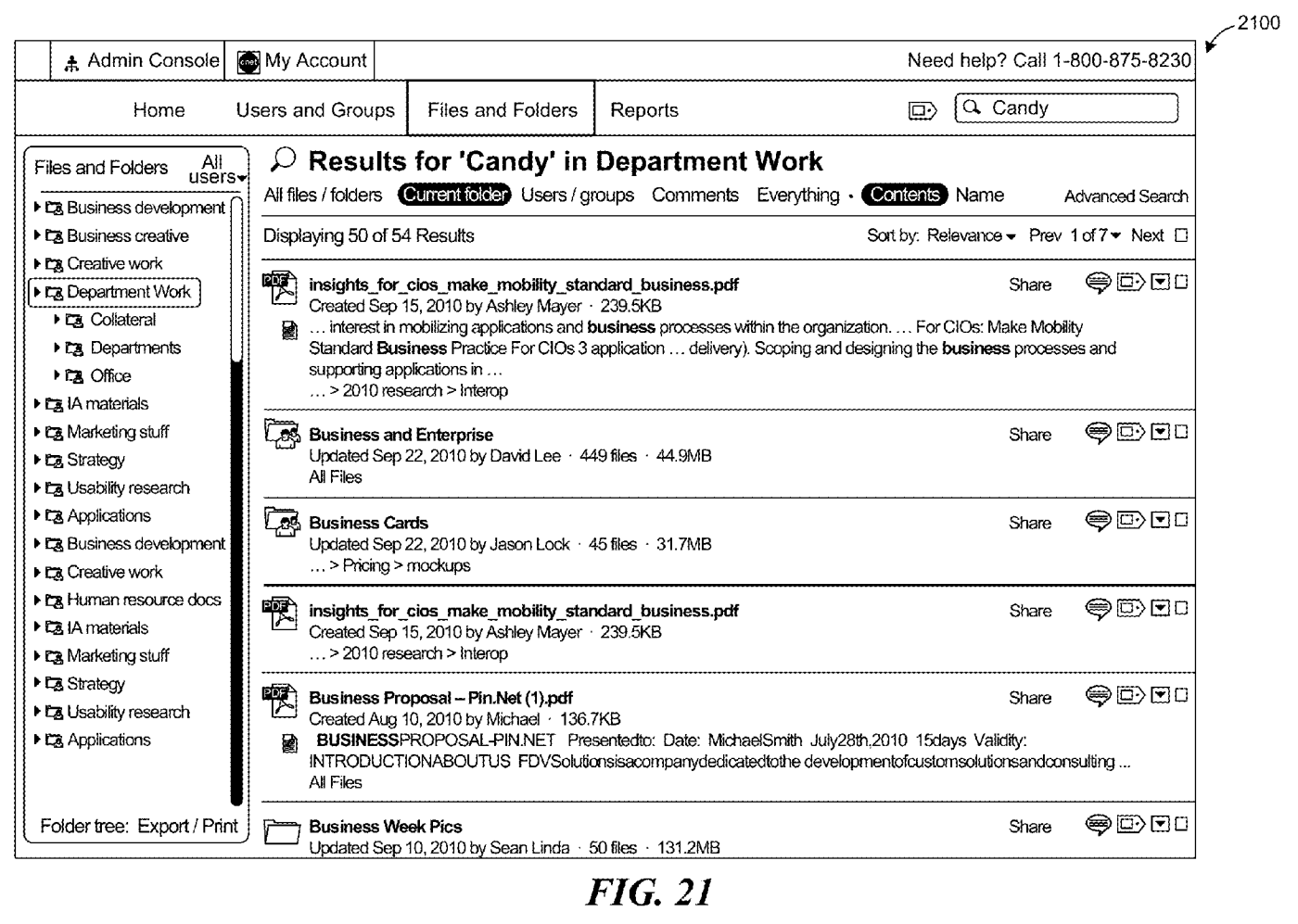

FIGS. 17-21 depict screenshots showing examples of views in a management console showing features enabling the administrative user to use various search parameters or terms to search for subsets of content aggregated among other users in a web-based collaboration environment. For example, panel 1702 enables the user to user to apply various search parameters to locate desired content in one folder or multiple folders or among users/user groups. Panels 1802 and 1804 in the example of FIG. 18 depict windows showing results identified from use of various search parameters.

Figure 22:
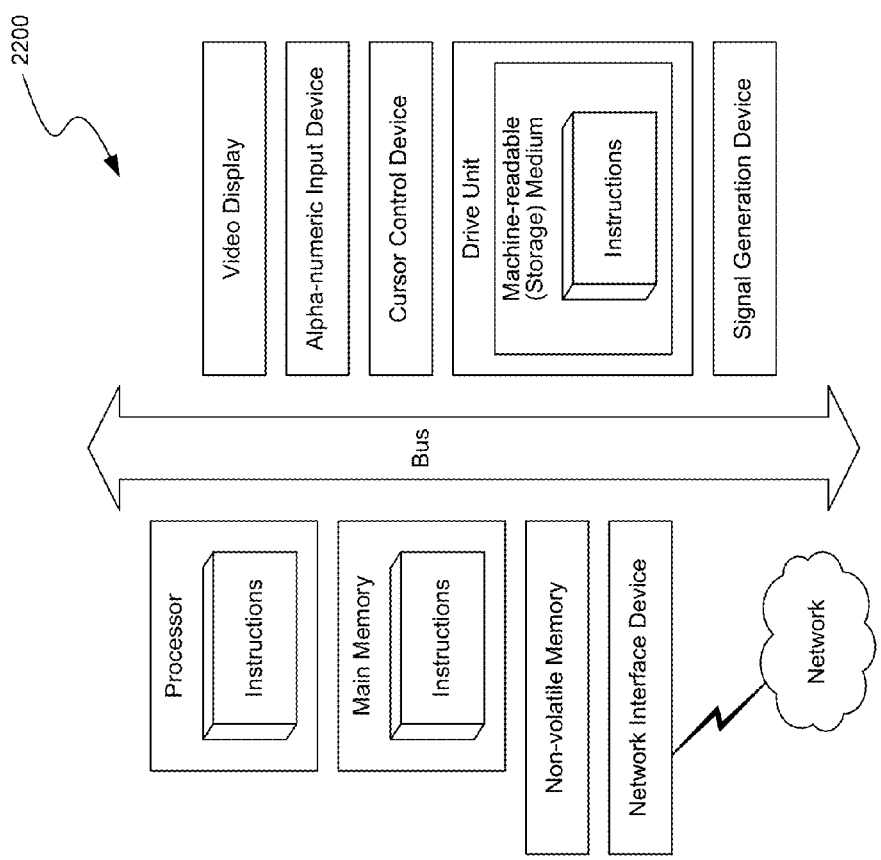
FIG. 22 shows a diagrammatic representation of a machine in the example form of a computer system within which a set of instructions, for causing the machine to perform any one or more of the methodologies discussed herein, may be executed.

FIG. 22 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for enabling a user to centrally manage content hosted in a web-based collaboration environment, the web-based collaboration environment including a plurality of workspaces representing groupings of sets of content hosted in the web-based collaboration environment, the method comprising:
presenting a common graphical user interface to the web-based collaboration environment, the common graphical user interface including a tab for a user view and a tab for an administrator view;
enabling access, via the user view, to the user's content and content of other users within one or more of a plurality of workspaces of the collaboration environment to which the user has been granted access as a collaborator, by at least one of the other users;
verifying that the user has administrator permissions to access an aggregate of the content in at least one of the plurality of workspaces of the collaboration environment and manage the other users associated with the at least one of the plurality of workspaces;
in response to verifying that the user has administrator permissions, enabling access, via the administrator view, to the aggregate of the content in at least one the plurality of workspaces of the collaboration environment to which the user has administrator permissions, regardless of whether the user has been granted access as a collaborator by another user, and
providing a management console in the administrator view through which the user can manage the other users associated with the at least one of the plurality of workspaces;
wherein access permissions include permissions to upload, download, view, preview, and edit individual work items;
wherein each work item includes a particular piece of content provided by one or more of the other users; and
wherein management permissions include permissions to track and monitor other users, assign tasks to other users, review the content of other users, and change access permission levels of other users.

2. The method of claim 1, wherein, the administrator view includes the aggregate of content provided by the other users presented as a list of files or folders.

3. The method of claim 1, wherein, through the administrator view, the user is able to selectively access a subset of the aggregate of the content by applying filtering mechanisms through the user interface to manage the content or one or more of the other users that provided the content.

4. The method of claim 3, wherein, the filtering mechanisms allow the user to access content associated with a specific workspace.

5. The method of claim 4, wherein, a subset of the other users are associated with the specific workspace.

6. The method of claim 1, wherein, the user view includes a panel for accessing an account of the user and work items owned by the user.

7. The method of claim 1, wherein, the user and the other users are affiliated with a common organization; wherein, the user assumes an administrative role in the common organization.

8. The method of claim 1, wherein, the filtering mechanisms allow the user to access content associated with a specific user of the other users.

9. The method of claim 1, wherein, the administrator view includes group management features to allow the user to manage user groups among the other users.

10. The method of claim 9, wherein, the user manages user groups by adjusting group associations and permissions.

11. The method of claim 1, wherein, the management permissions further include one or more of, assigning a task related to an individual work item to another user, version control or tracking of the individual work items in the aggregate set of content, changing or updating access permissions of the individual work items in the aggregate set of content, monitoring status of the individual work items or assigned tasks, and assigning tasks in a work space to a specific user of the other users.

12. The method of claim 1, wherein, the access permissions further include one or more of, uploading or creating work items in a work space associated with other users.

13. A system for enabling a user to centrally manage content hosted in a web-based collaboration environment, the web-based collaboration environment including a plurality of workspaces representing groupings of sets of content hosted in the web-based collaboration environment, the system comprising:
one or more or more processors; and
one or more memory units having instructions stored thereon, which when executed by the one or more processors, cause the system to:
present a common graphical user interface to the web-based collaboration environment, the common graphical user interface including a tab for a user view and a tab for an administrator view;
enable access, via the user view, to the user's content and content of other users within one or more of a plurality of workspaces of the collaboration environment to which the user has been granted access as a collaborator, by at least one of the other users;
verify that the user has administrator permissions to access an aggregate of the content in at least one of the plurality of workspaces of the collaboration environment and manage the other users associated with the at least one of the plurality of workspaces;

in response to verifying that the user has administrator permissions, enable access, via the administrator view, to the aggregate of the content in at least one the plurality of workspaces of the collaboration environment to which the user has administrator permissions, regardless of whether the user has been granted access as a collaborator by another user, and provide a management console in the administrator view through which the user can manage the other users associated with the at least one of the plurality of workspaces;

wherein access permissions include permissions to upload, download, view, preview, and edit individual work items;

wherein each work item includes a particular piece of content provided by one or more of the other users; and wherein management permissions include permissions to track and monitor other users, assign tasks to other users, review the content of other users, and change access permission levels of other users.

14. The system of claim 13, wherein, the administrator view includes group management features to allow the user to manage user groups among the other users.

15. The system of claim 14, wherein the user manages user groups by adjusting group associations and permissions.

16. The system of claim 14, wherein the management permissions further include one or more of assigning a task related to an individual work item to another user, version control or tracking of the individual work items in the aggregate set of content, changing or updating access permissions of the individual work items in the aggregate set of content, monitoring status of the individual work items or assigned tasks, and assigning tasks in a work space to a specific user of the other users.

17. The method of claim 14, wherein, the access permissions further include one or more of, uploading or creating work items in a work space associated with other users.

18. A non-transitory machine-readable storage medium having stored thereon instructions which when executed by a processor, causes the processor to perform a method for enabling a user to centrally manage content hosted in a web-based collaboration environment, the web-based collaboration environment including a plurality of workspaces representing groupings of sets of content hosted in the web-based collaboration environment, the method comprising:

presenting a common graphical user interface to the web-based collaboration environment, the common graphical user interface including a tab for a user view and a tab for an administrator view;

enabling access, via the user view, to the user's content and content of other users within one or more of a plurality of workspaces of the collaboration environment to which the user has been granted access as a collaborator, by at least one of the other users;

verifying that the user has administrator permissions to access an aggregate of the content in at least one of the plurality of workspaces of the collaboration environment and manage the other users associated with the at least one of the plurality of workspaces;

in response to verifying that the user has administrator permissions, enabling access, via the administrator view, to the aggregate of the content in at least one of the plurality of workspaces of the collaboration environment to which the user has administrator permissions, regardless of whether the user has been granted access as a collaborator by another user, and providing a management console in the administrator view through which the user can manage the other users associated with the at least one of the plurality of workspaces;

wherein access permissions include permissions to upload, download, view, preview, and edit individual work items;

wherein each work item includes a particular piece of content provided by one or more of the other users; and wherein management permissions include permissions to track and monitor other users, assign tasks to other users, review the content of other users, and change access permission levels of other users.

19. The non-transitory machine-readable storage medium of claim 18, wherein, the administrator view includes group management features to allow the user to manage user groups among the other users.

20. The non-transitory machine-readable storage medium of claim 18, wherein the user manages user groups by adjusting group associations and permissions.

21. The non-transitory machine-readable storage medium of claim 18, wherein the management permissions further include one or more of assigning a task related to an individual work item to another user, version control or tracking of the individual work items in the aggregate set of content, changing or updating access permissions of the individual work items in the aggregate set of content, monitoring status of the individual work items or assigned tasks, and assigning tasks in a work space to a specific user of the other users.

22. The non-transitory machine-readable storage medium of claim 18, wherein, the access permissions further include one or more of, uploading or creating work items in a work space associated with other users.

* * * * *